(12) United States Patent
Otani et al.

(10) Patent No.: US 9,380,198 B2
(45) Date of Patent: Jun. 28, 2016

(54) PHOTOGRAPHING SYSTEM, PHOTOGRAPHING METHOD, LIGHT EMITTING APPARATUS, PHOTOGRAPHING APPARATUS, AND COMPUTER-READABLE STORAGE MEDIUM

(71) Applicant: CASIO COMPUTER CO., LTD., Shibuya-ku, Tokyo (JP)

(72) Inventors: Daisuke Otani, Akishima (JP); Tetsuya Hayashi, Hanno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 269 days.

(21) Appl. No.: 14/017,162

(22) Filed: Sep. 3, 2013

(65) Prior Publication Data
US 2014/0092266 A1 Apr. 3, 2014

(30) Foreign Application Priority Data

Sep. 28, 2012 (JP) ................. 2012-217004
Oct. 2, 2012 (JP) ................. 2012-220578

(51) Int. Cl.
*H04N 5/232* (2006.01)
*H04N 5/235* (2006.01)

(52) U.S. Cl.
CPC ......... *H04N 5/23203* (2013.01); *H04N 5/2351* (2013.01); *H04N 5/23219* (2013.01)

(58) Field of Classification Search
CPC .................. H04N 5/23203; H04N 5/2351
USPC ........................................ 348/211.2
See application file for complete search history.

(56) References Cited

U.S. PATENT DOCUMENTS

| 6,933,956 B2 * | 8/2005 | Sato | ........................ G06F 3/147 345/690 |
| RE42,848 E | 10/2011 | Sato et al. | |

(Continued)

FOREIGN PATENT DOCUMENTS

| JP | 63097182 A | 4/1988 |
| JP | 04123674 A | 4/1992 |

(Continued)

OTHER PUBLICATIONS

Japanese Office Action, dated Aug. 19, 2014, issued in counterpart Japanese application No. 2012-217004.

(Continued)

*Primary Examiner* — Ahmed A Berhan
(74) *Attorney, Agent, or Firm* — Holtz, Holtz & Volek PC

(57) ABSTRACT

A photographing system of the present invention includes a light emitting apparatus which emits visible light including arbitrary information and a photographing apparatus which has a plurality of photographing functions, in which the light emitting apparatus includes a light emitting section which emits visible light including command information respectively corresponding to the plurality of photographing functions of the photographing apparatus, and the photographing apparatus includes a photographing section, a visible light information acquisition section which receives the visible light emitted by the light emitting section by the photographing section, and acquires the command information included in the visible light, and a photographing instruction section which instructs to perform at least one of the plurality of photographing functions based on the command information acquired by the visible light information acquisition section.

17 Claims, 20 Drawing Sheets

(56) References Cited

U.S. PATENT DOCUMENTS

| | | | |
|---|---|---|---|
| 8,121,404 B2 * | 2/2012 | Xiao | G03B 7/091 348/229.1 |
| RE44,004 E | 2/2013 | Sato et al. | |
| 2006/0050997 A1 | 3/2006 | Imamura | |
| 2006/0262365 A1 | 11/2006 | Imao | |
| 2011/0097067 A1 * | 4/2011 | Osawa | G03B 7/097 396/165 |

FOREIGN PATENT DOCUMENTS

| | | | |
|---|---|---|---|
| JP | 2003-179556 A | 6/2003 |
| JP | 2003-195409 A | 7/2003 |
| JP | 2004101616 A | 4/2004 |
| JP | 2004221924 A | 8/2004 |
| JP | 2006080809 A | 3/2006 |
| JP | 2006270263 A | 10/2006 |
| JP | 2006325150 A | 11/2006 |
| JP | 2007-201979 A | 8/2007 |
| JP | 2008070208 A | 3/2008 |
| JP | 2012-151544 A | 8/2012 |
| JP | 2012157039 A | 8/2012 |

OTHER PUBLICATIONS

Japanese Office Action dated Aug. 29, 2014 issued in counterpart Japanese Application No. 2012-220578.

* cited by examiner

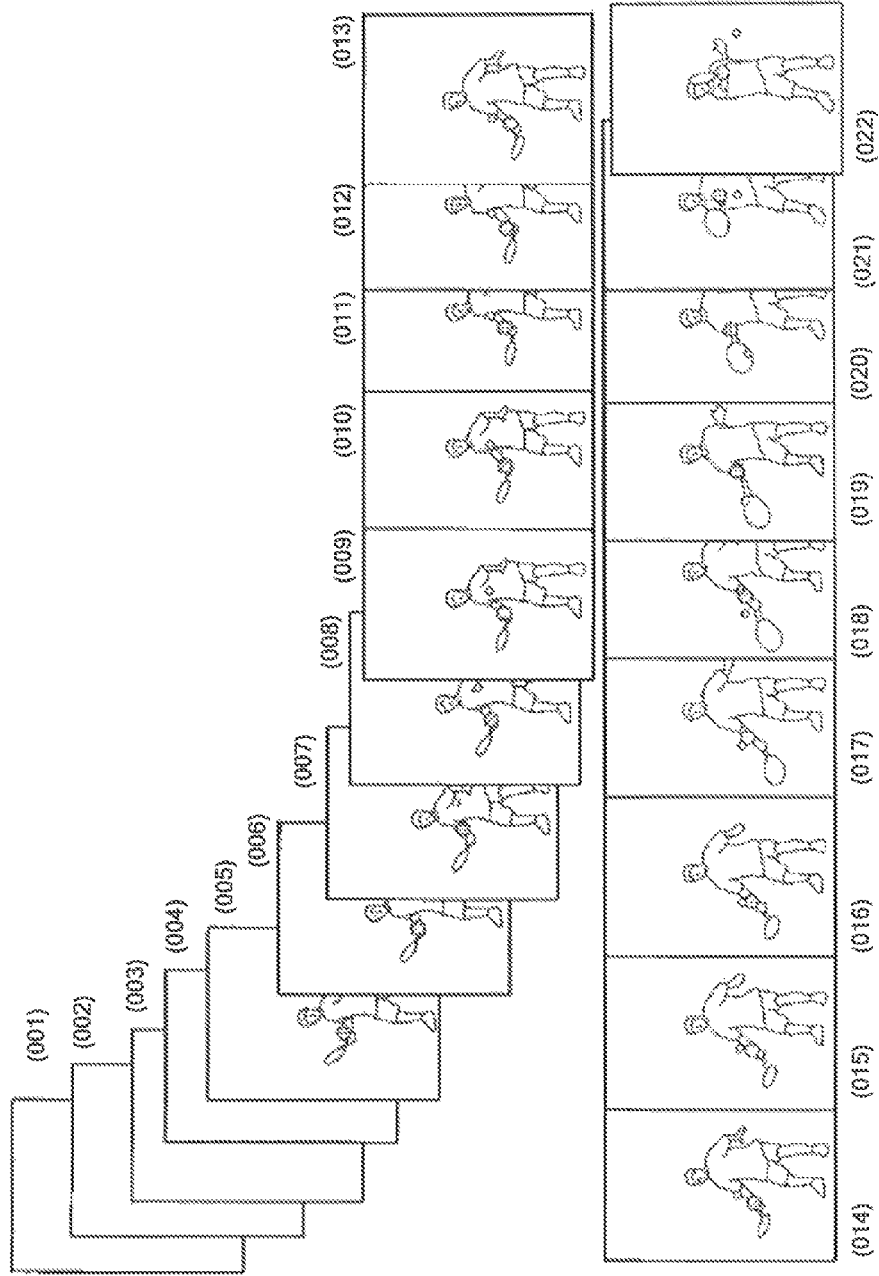

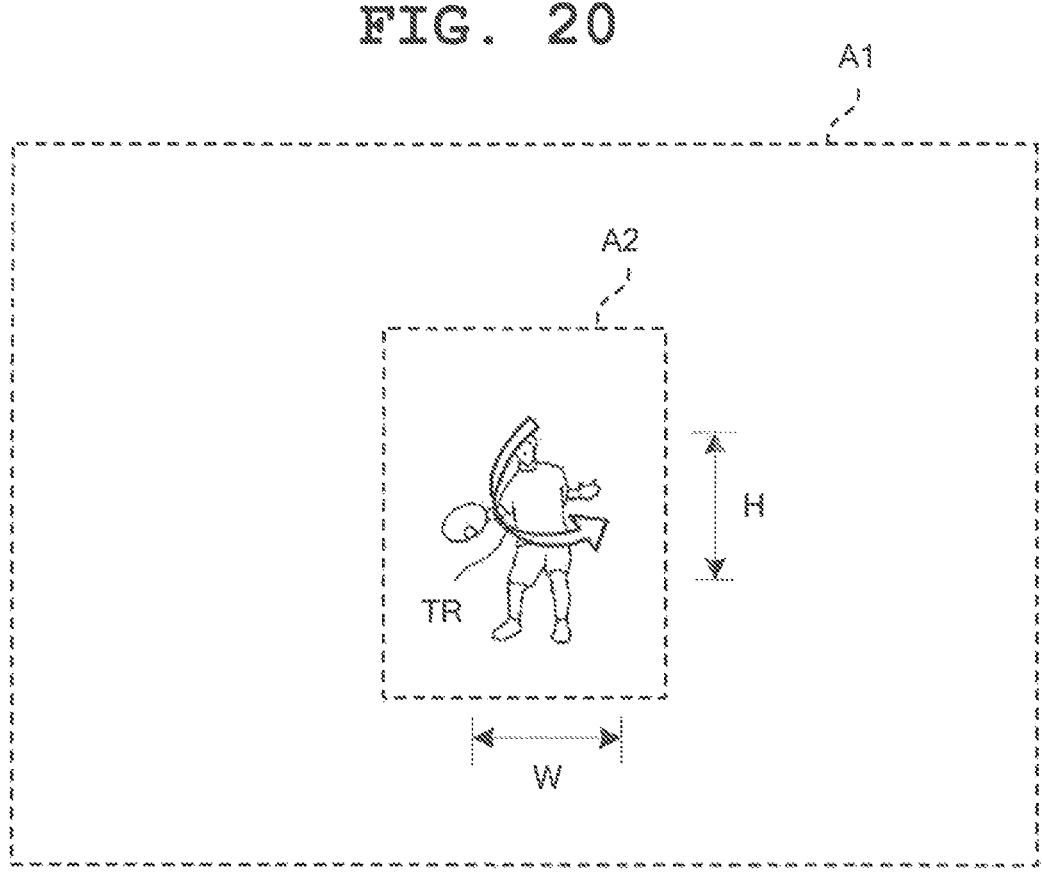

PHOTOGRAPHING SYSTEM, PHOTOGRAPHING METHOD, LIGHT EMITTING APPARATUS, PHOTOGRAPHING APPARATUS, AND COMPUTER-READABLE STORAGE MEDIUM

This application is based upon and claims the benefit of priority from the prior Japanese Patent Applications No. 2012-217004, filed Sep. 28, 2012 and No. 2012-220578, filed Oct. 2, 2012, the entire contents of which are incorporated herein by reference.

BACKGROUND OF THE INVENTION

1. Field of the Invention

The present invention relates to a photographing system in which visible light communications are used, a photographing method, a light emitting apparatus, a photographing apparatus, and a computer-readable storage medium.

2. Description of the Related Art

Conventionally, there have been known cameras and video cameras which include a function of recognizing a human figure in a viewing angle as an object, and setting various photographing conditions or tracking the object (for example, see Japanese Patent Application Laid-Open (Kokai) Publication No. 2012-151544, and Japanese Patent Application Laid-Open (Kokai) Publication No. 2007-201979).

Also, with regards to remote photographing in which a remote controller dedicated solely to cameras is used in order to restrain a release time lag which is generated at the time of photographing with the camera and execute the photographing at a timing that a photographer intends, there has been developed a technology in which the release time lag is restrained as much as possible (for example, see Japanese Patent Application Laid-Open (Kokai) Publication No. 2003-195409).

Incidentally, there is no practical technology, including the aforementioned conventional technology, which is useful in photographing a moment when the object distinctively moves, for example, a moment when a swinging racket hits a tennis ball in tennis. Therefore, the photographer himself needs to be proficient at photographing technique of this sort, or it is required to photograph a number of images which are temporally sequential and which include a moment that the photographer intends, with a camera device with a function of high-speed consecutive photographing.

Also, regarding the photographing apparatus according to the aforementioned conventional technology, for example, when a user who engages in sports such as tennis and golf desires to take a moving image of himself, it is conceivable that the photographing apparatus is fixed at an appropriate position with a tripod and the like, and a record start timing is remotely controlled with the use of an infrared remote controller at a separate location. However, regarding the aforementioned conventional technology, there is a problem in that it is difficult to remotely control the photographing apparatus under a certain condition where the object lies.

SUMMARY OF THE INVENTION

An object of the present invention is to provide a photographing system which can photograph an object in accordance with the status of the object, a photographing method, a light emitting apparatus, a photographing apparatus, and a computer-readable storage medium.

In accordance with one aspect of the present invention, there is provided a photographing system comprising: a light emitting apparatus which emits visible light including arbitrary information; and a photographing apparatus which has a plurality of photographing functions, wherein the light emitting apparatus comprises: a light emitting section which emits visible light including command information respectively corresponding to the plurality of photographing functions of the photographing apparatus, and wherein the photographing apparatus comprises: a photographing section; a visible light information acquisition section which receives the visible light emitted by the light emitting section by the photographing section, and acquires the command information included in the visible light; and a photographing instruction section which instructs to perform at least one of the plurality of photographing functions based on the command information acquired by the visible light information acquisition section.

In accordance with another aspect of the present invention, there is provided a photographing method using a light emitting apparatus which emits visible light including arbitrary information and a photographing apparatus which includes a photographing section and has a plurality of photographing functions, comprising: a light emitting step of, in the light emitting apparatus, emitting visible light including command information respectively corresponding to the plurality of photographing functions of the photographing apparatus, a visible light information acquisition step of, in the photographing apparatus, receiving the visible light emitted in the light emitting step by the photographing section, and acquiring the command information included in the visible light; and a photographing instruction step of, in the photographing apparatus, instructing to perform at least one of the plurality of photographing functions based on the command information acquired in the visible light information acquisition step.

In accordance with another aspect of the present invention, there is provided a light emitting apparatus which emits visible light including arbitrary information to a photographing apparatus having a plurality of photographing functions, comprising: a light emitting section which emits visible light including command information corresponding to each of the plurality of photographing functions of the photographing apparatus.

In accordance with another aspect of the present invention, there is provided a photographing apparatus having a plurality of photographing functions, comprising: a photographing section; a visible light information acquisition section which receives visible light including command information by the photographing section, and acquires the command information included in the visible light; and a photographing instruction section which instructs to perform at least one of the plurality of photographing functions based on the command information acquired by the visible light information acquisition section.

In accordance with another aspect of the present invention, there is provided a non-transitory computer-readable storage medium having stored thereon a program that is executable by a computer in a light emitting apparatus which emits visible light including arbitrary information to a photographing apparatus having a plurality of photographing functions, the program being executable by the computer to perform functions comprising: light emitting processing for emitting visible light including command information corresponding to each of the plurality of photographing functions of the photographing apparatus.

In accordance with another aspect of the present invention, there is provided a non-transitory computer-readable storage medium having stored thereon a program that is executable by a computer in a photographing apparatus including a photographing section and having a plurality of photographing functions, the program being executable by the computer to perform functions comprising: visible light information acquisition processing for receiving visible light including command information by the photographing section, and acquiring the command information included in the visible light; and photographing instruction processing for instructing to perform at least one of the plurality of photographing functions based on the command information acquired in the visible light information acquisition processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIGS. 6A to 6D are conceptual diagrams to describe the operation of the photographing system 1 of the first embodiment of the present invention, of which FIG. 6A illustrates first status, FIG. 6B illustrates second status, FIG. 6C illustrates third status, and FIG. 6D illustrates fourth status;

FIGS. 13A to 13D are conceptual diagrams to describe the operation of the photographing system 1 of the second embodiment of the present invention, of which FIG. 13A illustrates first status, FIG. 13B illustrates second status, FIG. 13C illustrates third status, and FIG. 13D illustrates fourth status;

FIGS. 16A to 16D are conceptual diagrams to describe the operation of the photographing system 1 of the third embodiment of the present invention, of which FIG. 16A illustrates first status, FIG. 16B illustrates second status, FIG. 16C illustrates third status, and FIG. 16D illustrates fourth status;

FIG. 19 is a diagram illustrating temporally sequential images of a scene where a person wearing a wrist band according to the fourth embodiment of the present invention is playing tennis; and FIG. 20 is a diagram exemplifying a trimming range with respect to an image held in an image buffer according to the fourth embodiment of the present invention.

DETAILED DESCRIPTION OF THE PREFERRED EMBODIMENTS

Hereinafter, the embodiment of the present invention will be described referring to drawings.

A. First Embodiment

Figure 1:
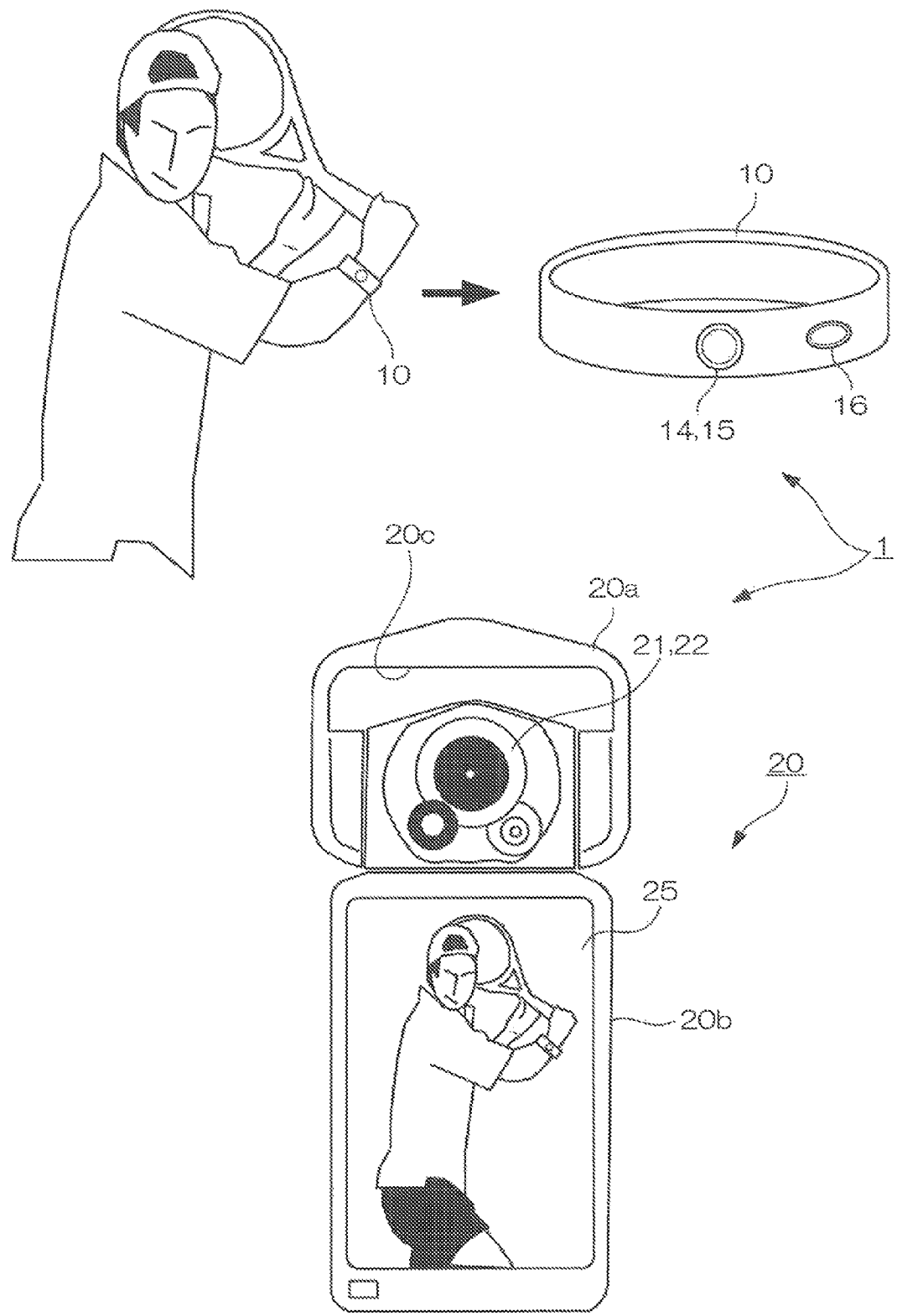
FIG. 1 is a block diagram illustrating the configuration of a photographing system 1 of a first embodiment of the present invention.

FIG. 1 is a block diagram illustrating the configuration of a photographing system 1 of the first embodiment of the present invention. In FIG. 1, the photographing system 1 is a visible light communication system made up of a light tag 10 which is a light emitting apparatus to be worn on the wrist of a user (object) and the like, and a photographing apparatus 20 which is a light receiving apparatus to photograph an object. As illustrated in FIG. 1, the light tag 10 has a body which is formed in a detachable, belt shape. For example, the light tag 10 is wearable on the wrist of the user (object) as illustrated.

The light tag 10 may be attached on a playing tool (for example, a racket in tennis, or a golf club in golf) besides the wrist of the user. Further, the light tag 10 may be structured to be hung on the neck or to be pasted on a shoulder or a thoracic portion. There are provided, on the outer circumferential surface of the light tag 10, a light emitting section 14 and a light emitting window 15 which emit the light outside, and a key input section 16 which is designed for the user, who wears the light tag 10, to operate the photographing system 1.

As illustrated in FIG. 1, the photographing apparatus 20 is constituted by a case 20a in which an optical lens section 21 and a photographing section 22 are provided, and a case 20b in which a display section 25 is provided. A handle section 20c is provided on the case 20a in order to hook and fix the photographing apparatus 20 on the wire netting and the like.

Here, in the present embodiment, a person who plays tennis serves as an object wearing the light tag 10 having the structure illustrated in FIG. 1, and the photographing apparatus 20 photographs a situation where he or she is playing tennis.

Figure 2A:
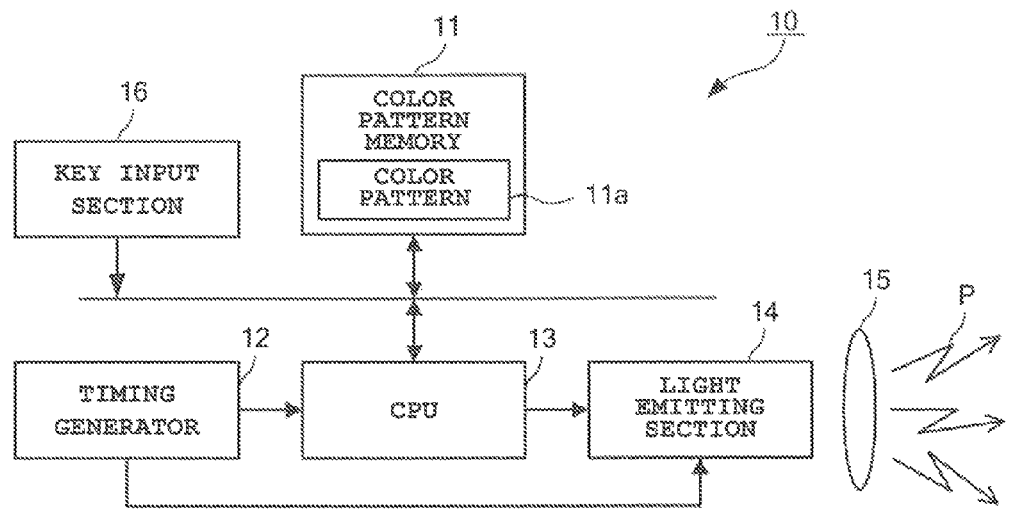
FIGS. 2A and 2B are block diagrams illustrating the structures of a light tag 10 and a photographing apparatus 20 of the first embodiment of the present invention.
Figure 2B:
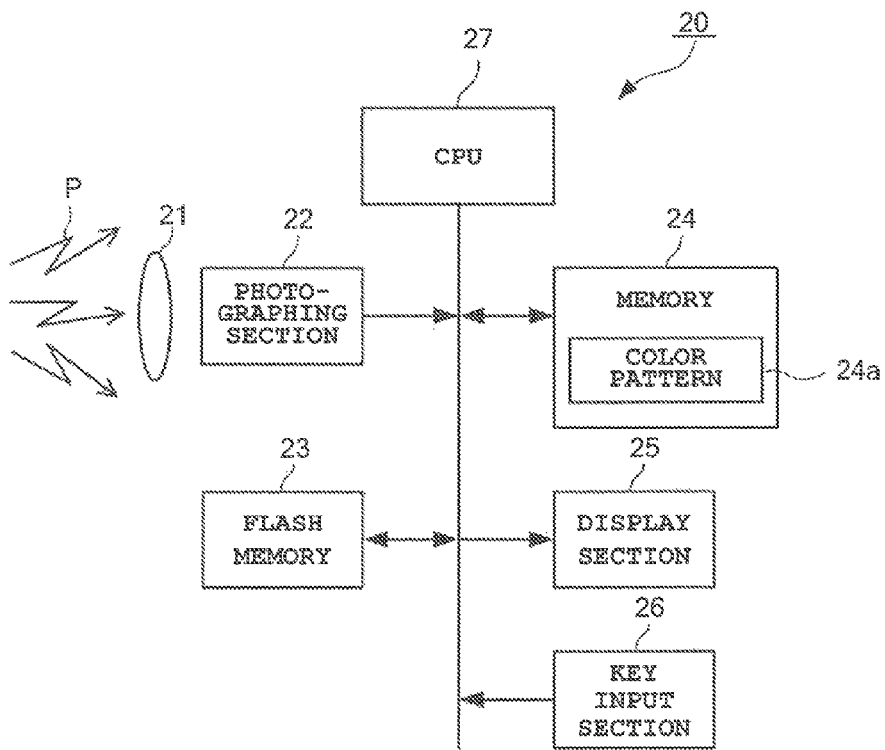
Figure 3:
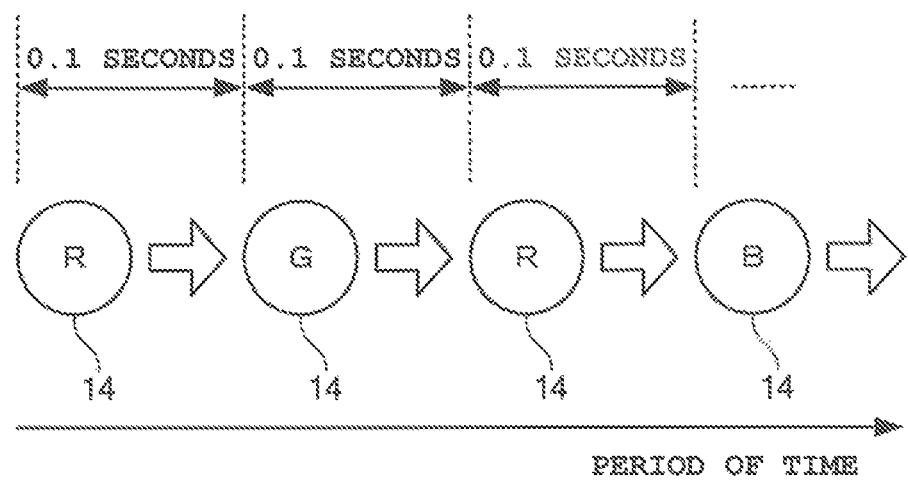
FIG. 3 is a conceptual diagram illustrating one example of color patterns emitted by the light tag 10 of the first embodiment of the present invention.

FIGS. 2A and 2B are block diagrams illustrating the structures of the light tag 10 and the photographing apparatus 20 of the first embodiment of the present invention. In FIG. 2A, the light tag 10 includes a color pattern memory 11, a timing generator 12, a CPU (Central Processing Unit) 13, the light emitting section 14, and the light emitting window 15. The color pattern memory 11 stores a color pattern 11a set in advance (first command information). The color pattern 11a is exemplified by a time-series line of red (R), green (G), and blue (B). In the first embodiment of the present invention, as illustrated in FIG. 3, the color pattern 11a is represented in the order of the red (R), the green (G), the red (R), the blue (B), etc. As such, color patterns from color components RGB are used as the visible light communications, whereby the user is provided with clear visibility and a desired image can be easily detected from photographed images in the photographing apparatus 20. The details of information on the visible light communications are disclosed by Japanese Patent Application Laid-Open (Kokai) Publication No. 2003-179556, and accordingly its description is omitted.

The timing generator 12 generates a clock signal CK having a steady predetermined cycle. The CPU 13 sequentially reads out the color pattern 11a from the color pattern memory 11 in synchronization with the clock signal CK from the timing generator 12, and supplies the color pattern (signal) 11a, which has been taken out after header information indicating data delivery, to the later-described light emitting section 14.

The light emitting section 14 includes light emitting elements (LED; Light Emitting Diode) corresponding to the color components RGB. The light emitting section 14 outputs, via the light emitting window 15, light P having a color pattern in which color is temporally changed, in synchronization with the clock signal CK from the timing generator 12, in accordance with the color pattern (signal) 11a. Note that, in the first embodiment of the present invention, as illustrated in FIG. 3, a period of time during which light is emitted is set to 0.1 seconds. The later-described photographing apparatus 20 is configured to receive the light having a color pattern in which the color is temporally changed, and thereby recognize the light tag 10.

In FIG. 2B, the photographing apparatus 20 includes the optical lens section 21, the photographing section 22, a flash memory 23, a memory 24, the display section 25, a key input section 26, and a CPU 27. The photographing section 22, for example, is constituted by a two-dimensional image sensor such as a CCD (Charge-Coupled Device) and a CMOS (Complementary Metal-Oxide Semiconductor). The photographing section 22 electrically converts images taken in through the optical lens section 21 at a predetermined frame rate into a frame image signal and sequentially stores the images in the flash memory 23. In particular, in the first embodiment of the present invention, the photographing apparatus 20 can partially read out (trimming) an image of an arbitrary size from among images taken in through the optical lens section 21.

The flash memory 23 stores frames (images) from the photographing section 22 in time series or stores frames (images) whose portion of an arbitrary size has been partially read out (trimming), in time series. The memory 24 is made up of a ROM (Read Only Memory) which stores programs and a RAM (Random Access Memory) which is used as a working space memory of the later-described CPU 27. In particular, in the first embodiment of the present invention, the memory 24 stores a color pattern (data) 24a set in advance, as in the case of the light tag 10. The color pattern (data) 24a is similar to the color pattern 11a of the light tag 10, or in other words, it is exemplified in the order of the red (R), the green (G), the red (R), the blue (B), etc., as illustrated in FIG. 3.

The display section 25, which is made up of a liquid crystal display device or an organic electroluminescence display device, displays photographed images taken in by the photographing section 22 through the optical lens section 21, or displays photographed images at the time of replay. The key input section 26 is made up of a photographing button and various setting keys, and inputs the user's instruction operation in order to control the operation of the photographing apparatus 20.

The CPU 27 controls each aforementioned section based on the execution of a predetermined program. Specifically, the CPU 27 analyzes a photographed image in unit of frame of the image taken in by the photographing section 22, judges the shape of the face of an object (for example, a person) or the shape or positional relation of parts (eyes, mouth, nose, forehead, and the like) forming the face, comprehensively, and detects the object. In this case, when a plurality of objects are included in the photographed image, the CPU 27 individually detects the object. Note that the object recognition function, which includes facial detection, is a technology generally used in a photographing apparatus, and this well-known technology is used in the present embodiment. Accordingly, its specific description is omitted.

Next, the operation of the light tag 10 and the photographing apparatus 20 of the aforementioned first embodiment will be described. In the first embodiment of the present invention, when the predetermined color pattern 24a (11a) is detected out of images taken in by the photographing section 22, the CPU 27 determines an object wearing the light tag 10, starts photographing a moving image, and controls the photographing operation of the photographing section 22 in a manner to continue the photographing of the moving image in a period of time during which the predetermined color pattern is detected.

Figure 4:
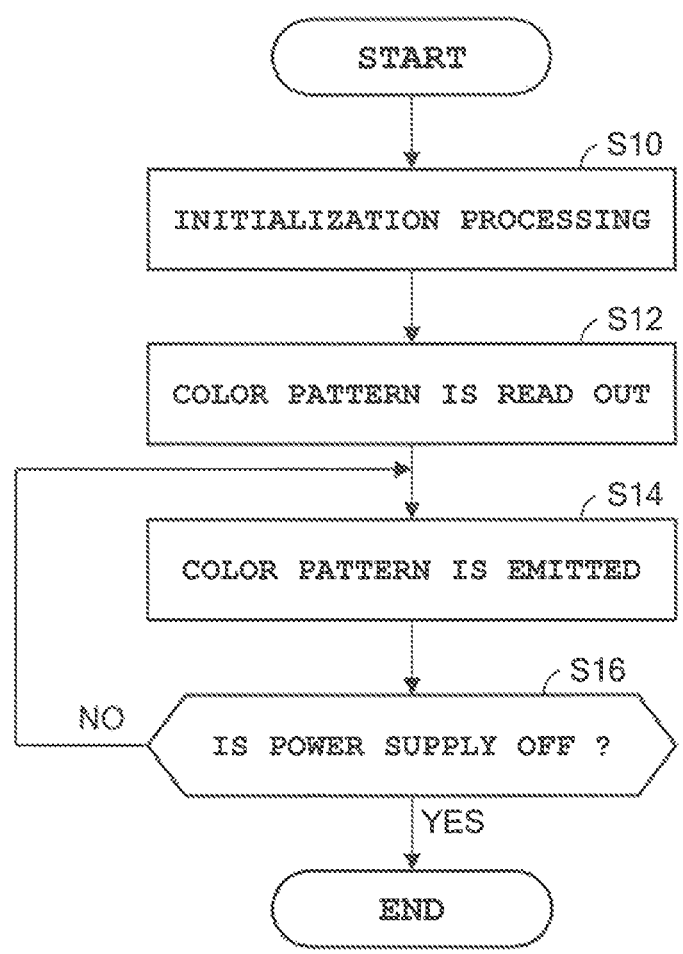
FIG. 4 is a flowchart to describe the operation of the light tag 10 of the first embodiment of the present invention.

FIG. 4 is a flowchart to describe the operation of the light tag 10 of the first embodiment of the present invention. First, the user wears the light tag 10 on his or her wrist, and turns on the power of the light tag 10 before starting to play tennis. Upon the activation of the power supply, the CPU 13 of the light tag 10 performs initialization processing (Step S10), sequentially reads out the color pattern 11a from the color pattern memory 11 in synchronization with the clock signal CK from the timing generator 12 (Step S12), and supplies the color pattern (signal), which has been taken out after header information indicating data delivery, to the later-described light emitting section 14.

The light emitting section 14 emits the light P having the color pattern 11a in which color is temporally changed, in synchronization with the clock signal CK from the timing generator 12 via the light emitting window 15 (Step S14). Subsequently, the CPU 13 judges whether or not the operation of turning off the power has been performed (Step S16). When the operation of turning off the power has not been performed (Step S16, NO), the CPU 13 returns to the Step S14, and the light emitting section 14 repeatedly emits the color pattern 11a. In contrast, when the operation of turning off the power has been performed (Step S16, YES), the CPU 13 ends the corresponding processing.

Figure 5:
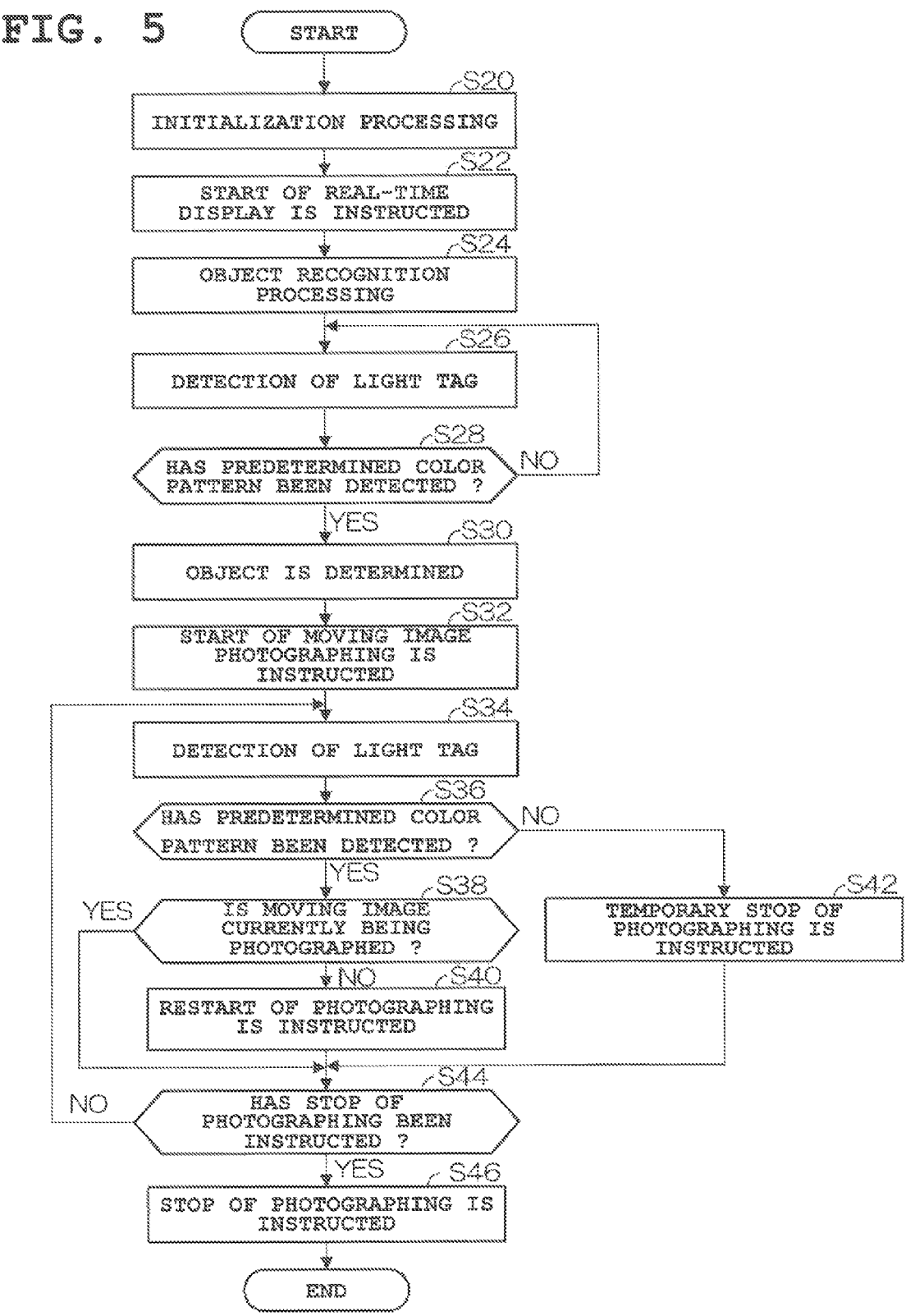
FIG. 5 is a flowchart to describe the operation of the photographing apparatus 20 of the first embodiment of the present invention.

FIG. 5 is a flowchart to describe the operation of the photographing apparatus 20 of the first embodiment of the present invention. After the light tag 10 is prepared, the user hooks and fixes the handle section 20c on wire netting and the like, and turns on the power of the photographing apparatus 20 by the key input section 26. When the power is turned on, the CPU 27 of the photographing apparatus 20 performs the initialization processing (Step S20) and instructs the photographing section 22 to start real-time display (Step S22). The photographing section 22 receives the instruction and starts the real-time display in which images taken in through the optical lens section 21 are displayed on the display section 25 (images are not stored).

Next, the CPU 27 performs pattern recognition of a person or the like and executes the object recognition processing by which the object in the image displayed in real time is recognized (Step S24). Subsequently, the CPU 27 detects the light tag 10 in the frame of the recognized object (Step S26) and judges whether or not the predetermined color pattern 24a (equivalent to the color pattern 11a) has been detected (Step S28). Then, when the predetermined color pattern 24a (equivalent to the color pattern 11a) has not been detected (Step S28, NO), the CPU 27 returns to the Step S26, and repeats the detection of the light tag 10, that is, the detection of the predetermined color pattern 24a (equivalent to the color pattern 11a).

In contrast, when the predetermined color pattern 24a (equivalent to the color pattern 11a) in the frame of the object in the image displayed in real time has been detected (Step S28, YES), the CPU 27 determines the frame of the object in which the predetermined color pattern 24a (equivalent to the color pattern 11a) has been detected, as a specific object (Step S30). The specific object is an object to be photographed who is wearing the light tag 10. When the specific object is determined, the CPU 27 instructs the photographing section 22 to start photographing a moving image (Step S32), whereby the photographing section 22 starts photographing a moving image. That is, the photographing section 22 electrically converts images taken in through the optical lens section 21 at a predetermined frame rate into a frame image signal, and sequentially stores the images in the flash memory 23, as a moving image.

Note that the photographing section 22 may directly store images taken in through the optical lens section 21 as a moving image. However, in the first embodiment of the present invention, images including the object wearing the light tag 10 are cut out (trimming) to be a predetermined size, and stored as a moving image.

Subsequently, the CPU 27 detects the light tag 10 in the frame of the recognized object even during the photographing of the moving image (Step S34), and judges whether or not the predetermined color pattern 24a (equivalent to the color pattern 11a) has been detected (Step S36). Then, when the predetermined color pattern 24a (equivalent to the color pattern 11a) has been detected (Step S36, YES), the CPU 27 judges whether or not moving image photographing is currently being performed (Step S38). When moving image photographing is currently being performed (Step S38, YES), the CPU 27 judges whether or not the stop of photographing has been instructed via the key input section 26 (Step S44). When the stop of photographing has not been instructed (Step S44, NO), the CPU 27 returns to the Step S34, and repeats the detection of the light tag 10, or in other words, the detection of the predetermined color pattern 24a (equivalent to the color pattern 11a). That is, while the predetermined color pattern 24a (equivalent to the color pattern 11a) is being detected, moving image photographing is continuously performed.

In contrast, when the predetermined color pattern 24a (equivalent to the color pattern 11a) is no longer detected during the moving image photographing (Step S36, NO), the CPU 27 instructs the photographing section 22 to temporarily stop the moving image photographing (Step S42). Accordingly, the photographing section 22 temporarily stops the moving image photographing. Note that a configuration may be adopted in which the temporary halt of the moving image photographing is not performed immediately after the judgment that the predetermined color pattern 24a (equivalent to the color pattern 11a) is no longer detected, a time lag of a predetermined period of time (for example, approximately 20 seconds or 30 seconds) is provided for and, when the predetermined time has elapsed but the predetermined color pattern 24a (equivalent to the color pattern 11a) has not been detected again, the moving image photographing is temporarily stopped.

Subsequently, the CPU 27 judges whether or not the stop of the photographing has been instructed via the key input section 26 (Step S44). When the stop of the photographing has not been instructed (Step S44, NO), the CPU 27 returns to the Step S34, and repeats the detection of the light tag 10, or in other words, the detection of the predetermined color pattern 24a (equivalent to the color pattern 11a). That is, while the predetermined color pattern 24a (equivalent to the color pattern 11a) is not being detected for some reasons (for example, when the light tag 10 is being covered by an obstacle or the like), the moving image photographing is temporarily stopped.

In contrast, when the predetermined color pattern 24a (equivalent to the color pattern 11a) is detected again during the temporary stop of the moving image photographing (Step S36, YES), the CPU 27 judges whether or not the moving image photographing is currently being performed (Step S38). Here, since the moving image photographing is temporarily being stopped (Step S38, NO), the CPU 27 instructs the photographing section 22 to restart the moving image photographing (Step S40). Accordingly, the photographing section 22 restarts the moving image photographing. Subsequently, the CPU 27 judges whether or not the stop of the photographing has been instructed via the key input section 26 (Step S44). When the stop of the photographing has not been instructed (Step S44, NO), the CPU 27 returns to the Step S34, and repeats the detection of the light tag 10, or in other words, the detection of the predetermined color pattern 24a (equivalent to the color pattern 11a). That is, when the predetermined color pattern 24a (equivalent to the color pattern 11a) is detected again, the moving image photographing is restarted.

Then, when the stop of the photographing is instructed via the key input section 26 (Step S44, YES), the CPU 27 instructs the photographing section 22 to stop the moving image photographing (Step S46). Accordingly, the photographing section 22 stops the moving image photographing, and the CPU 27 ends the corresponding processing.

FIGS. 6A to 6D are conceptual diagrams to describe the operation of the photographing system 1 of the first embodiment of the present invention. For example, when two players A and B are practicing tennis in a tennis court, one player B out of the two is photographed. As illustrated by first status in FIG. 6A, when the two players A and B are not in the viewing angle of the photographing section 22, the two players A and B are not displayed on the display section 25, and therefore the CPU 27 does not carry out object recognition based on pattern recognition in a viewing angle 250.

Figure 6A:
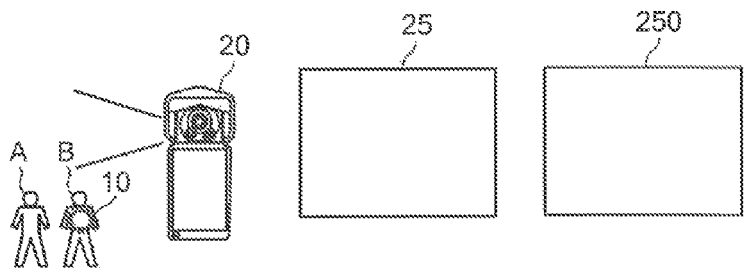
Figure 6B:
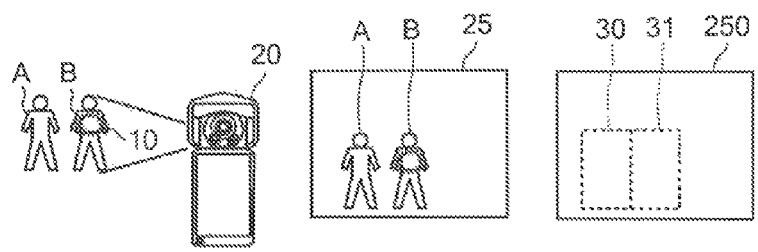

Next, when the two players A and B enters the tennis court, the images of the two players A and B come within the viewing angle of the photographing section 22, and the two players A and B are displayed on the display section 25, as illustrated by second status in FIG. 6B. Subsequently, the CPU 27 carries out object recognition based on pattern recognition in the viewing angle 250 and detects the two players A and B. In the diagram, the recognized objects are illustrated by object frames 30 and 31. Then, the photographing section 22 adjusts the object frames 30 and 31 such that automatic focusing and exposure are appropriately provided.

Figure 6C:
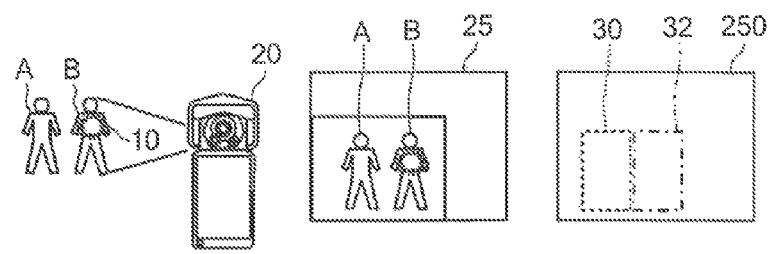
Figure 6D:
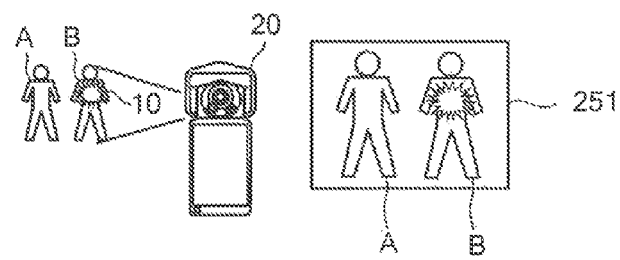

Next, as illustrated by third status in FIG. 6C, when the CPU 27 of the photographing apparatus 20 detects the light tag 10 (color pattern) worn by the specific player B, the CPU 27 determines the player B as a specific object (frame 32). Then, as illustrated by fourth status in FIG. 6D, the CPU 27 cuts out (trimming) an image 251 including the player B, regards the cut image 251 as a viewing angle to be recorded, and starts recording a moving image.

According to the first embodiment of the present invention, when the photographing apparatus 20 detects the light tag 10 which is a transmission apparatus of the visible light communications and worn by an object itself, the photographing apparatus 20 starts moving image photographing. Accordingly, an object wearing the light tag 10 can be brought into focus, and a moving image for which exposure has been appropriately adjusted can be photographed. As a result of this configuration, moving image photographing in accordance with the state of an object (movement in and out of the viewing angle) can be performed.

Note that, in the aforementioned first embodiment, when the stop of photographing is instructed via the key input section 26 and the like, the photographing is stopped. However, the present invention is not limited thereto, and a configuration may be adopted in which an elapsed time from the start of photographing is counted and, when a predetermined amount of time elapses, the photographing is automatically completed.

In the aforementioned first embodiment, the color pattern stored in the light tag 10 is recognized for each user based on a different color pattern, and the different color pattern allocated to each user is stored in the photographing apparatus 20, so that the user can be recognized based on the color pattern to be detected. Accordingly, even when there are a plurality of users who is wearing the light tag 10 in the viewing angle, a desired, specific user can be specified as a specific object, and photographed.

Figure 7:
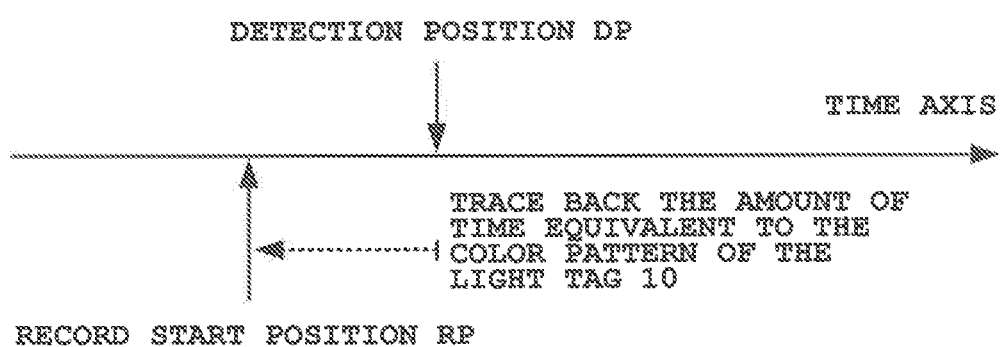
FIG. 7 is a conceptual diagram to describe the operation (past movie) of the photographing system 1 of the first embodiment of the present invention.

Also, in the aforementioned first embodiment, a configuration may be adopted in which, unlike a configuration where moving image photographing is started after the light tag 10 which emits a predetermined color pattern is detected, a moving image is photographed (recorded) while being continuously renewed for every predetermined period of time from the time of turning on the power, and recorded from a time point (record start position RP) traced back a predetermined period of time (for example, the amount of time equivalent to the color pattern of the light tag 10) (past movie), when the light tag 10 which emits a predetermined color pattern is detected (detection position DP), as illustrated in FIG. 7. This can prevent the user from missing the opportunity of photographing which is attributed to a delay in the start of recording by a period of time during which the color pattern is recognized.

B. Second Embodiment

Figure 8A:
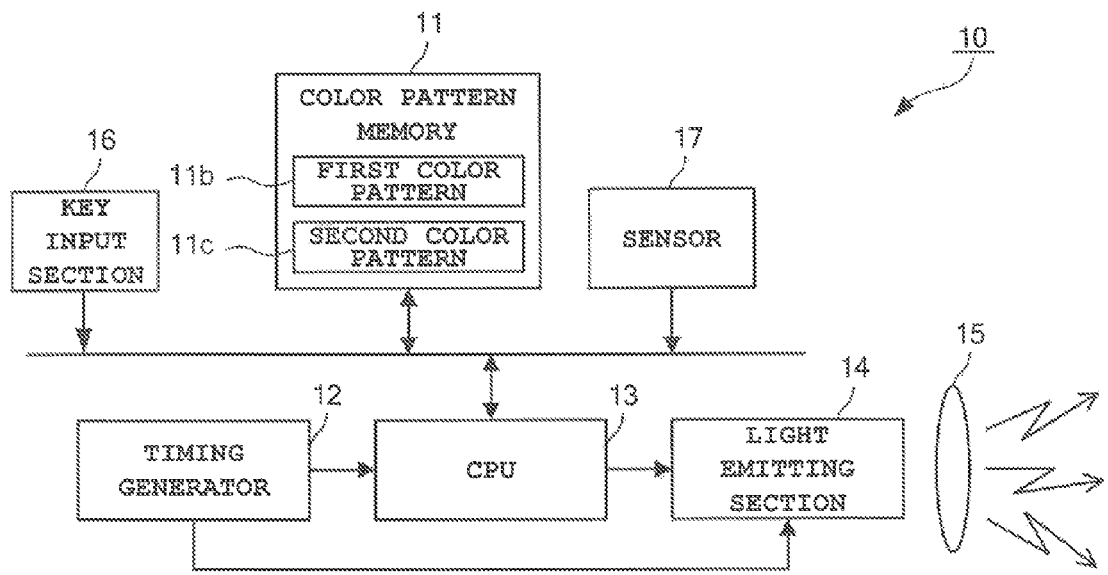
FIGS. 8A and 8B are block diagrams illustrating the structures of the light tag 10 and the photographing apparatus 20 of a second embodiment of the present invention.
Figure 8B:
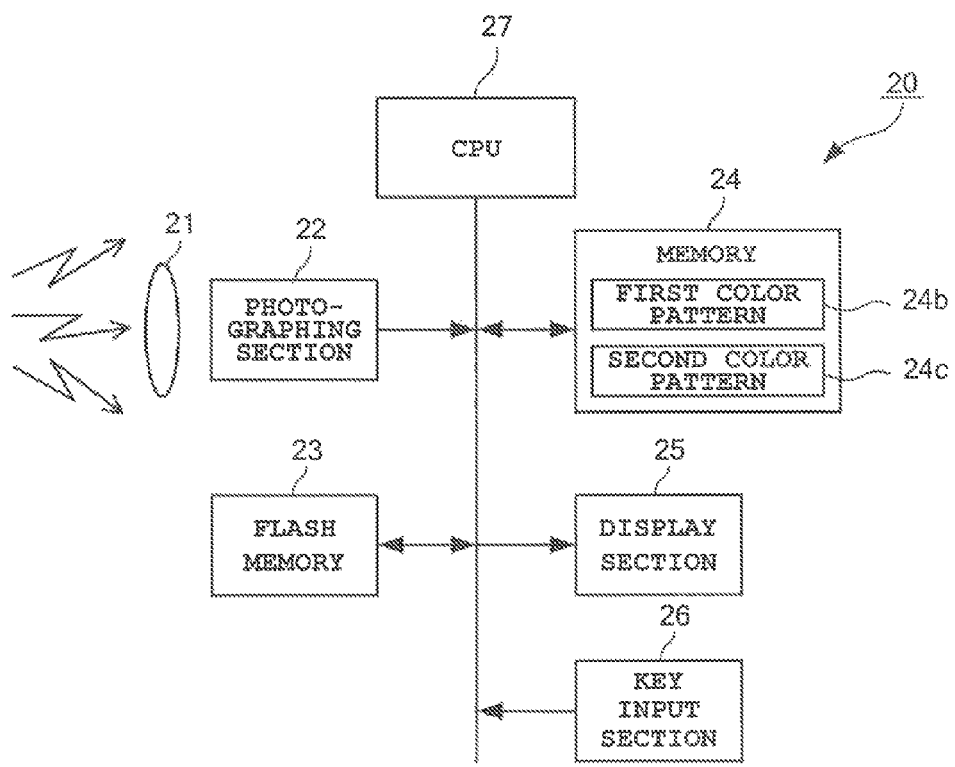
Figure 9A:
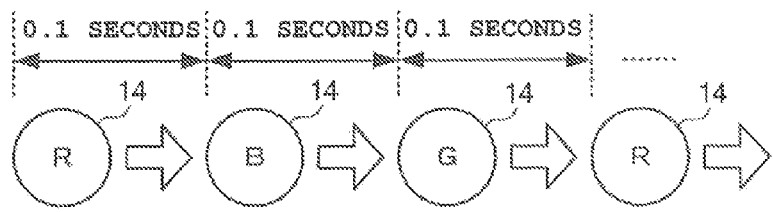
FIGS. 9A and 9B are conceptual diagrams illustrating one example of color patterns emitted by the light tag 10 of the second embodiment of the present invention.
Figure 9B:
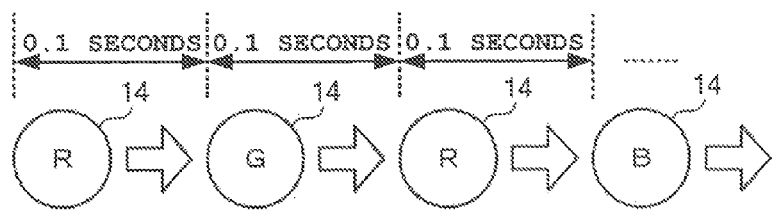

Next, the second embodiment of the present invention will be described. FIGS. 8A and 8B are block diagrams illustrating the structures of the light tag 10 and the photographing apparatus 20 of the second embodiment of the present invention. In the diagrams, sections corresponding to those of FIGS. 2A and 2B are provided with the same reference numerals, and therefore explanations thereof are omitted. In FIG. 8A, the color pattern memory 11 stores a first color pattern 11b (first command information) and a second color pattern 11c (second command information). As for the first color pattern 11b and the second color pattern 11c, red (R), green (G), and blue (B) are provided in time series. For example, as described in FIG. 9A, the first color pattern 11b is represented in the order of the red (R), the blue (B), the green (G), the red (R), etc. In addition, as described in FIG. 9B, the second color pattern 11c is represented in the order of the red (R), the green (G), the red (R), the blue (B), etc. Note that, in the second embodiment of the present invention, as described in FIGS. 9A and 9B, a period of time during which the light regarding each color is emitted is set to 0.1 seconds.

Also, a sensor 17 (for example, acceleration sensor) detects the acceleration of the light tag 10 (magnitude and velocity of movement), that is, the acceleration of an object (magnitude and velocity of movement) wearing the light tag 10. When the acceleration of the light tag 10 (magnitude and velocity of movement) which is detected by the sensor 17, that is, the acceleration of the object (magnitude and velocity of movement) is lower than a predetermined threshold value, the CPU 13 allows the light emitting section 14 to emit the first color pattern 11b. In contrast, when the acceleration of the object (magnitude and velocity of movement) is equal to or higher than a predetermined threshold value, the CPU 13 allows the light emitting section 14 to switch the color patterns to be emitted from the first color pattern 11b to the second color pattern 11c.

Next, in FIG. 8B, the memory 24 stores a first color pattern 24b set in advance and a second color pattern 24c, as is the case of the light tag 10. As described in FIG. 9A, the first color pattern 24b is represented by the same pattern as that of the first color pattern 11b of the light tag 10, that is, by the order of the red (R), the blue (B), the green (G), the red (R), etc. Also, as described in FIG. 9B, the second color pattern 24c is represented by the same pattern as that of the second color pattern 11c of the light tag 10, that is, by the order of the red (R), the green (G), the red (R), the blue (B), etc.

In the photographing apparatus 20, the CPU 27 receives the light of the first color pattern 24b (11b) whose color is temporally changed, recognizes the light tag 10, and starts moving image photographing in a normal moving-image photographing mode. Also, the CPU 27 receives the light of the second color pattern 24c (11c) whose color is temporally changed, switches to another moving-image photographing mode which is different from the aforementioned normal moving-image photographing mode, and continues moving image photographing. As another moving-image photographing mode, a high-speed moving-image photographing mode is executed in which the number of frames per unit time is increased and slow-motion playback is performed at the time of playback.

That is, in a case where a frame rate is 30 fps in the normal moving-image photographing mode, a frame rate in the high-speed moving-image photographing mode is increased to 60 fps, 90 fps, 120 fps, and more for moving image photographing. That is, when the acceleration of the light tag 10 (magnitude and velocity of movement) is low, the photographing apparatus 20 performs moving image photographing in the normal moving-image photographing mode. When the acceleration of the light tag 10 (magnitude and velocity of movement) is high, the photographing apparatus 20 performs moving image photographing in the high-speed moving-image photographing mode.

Figure 10:
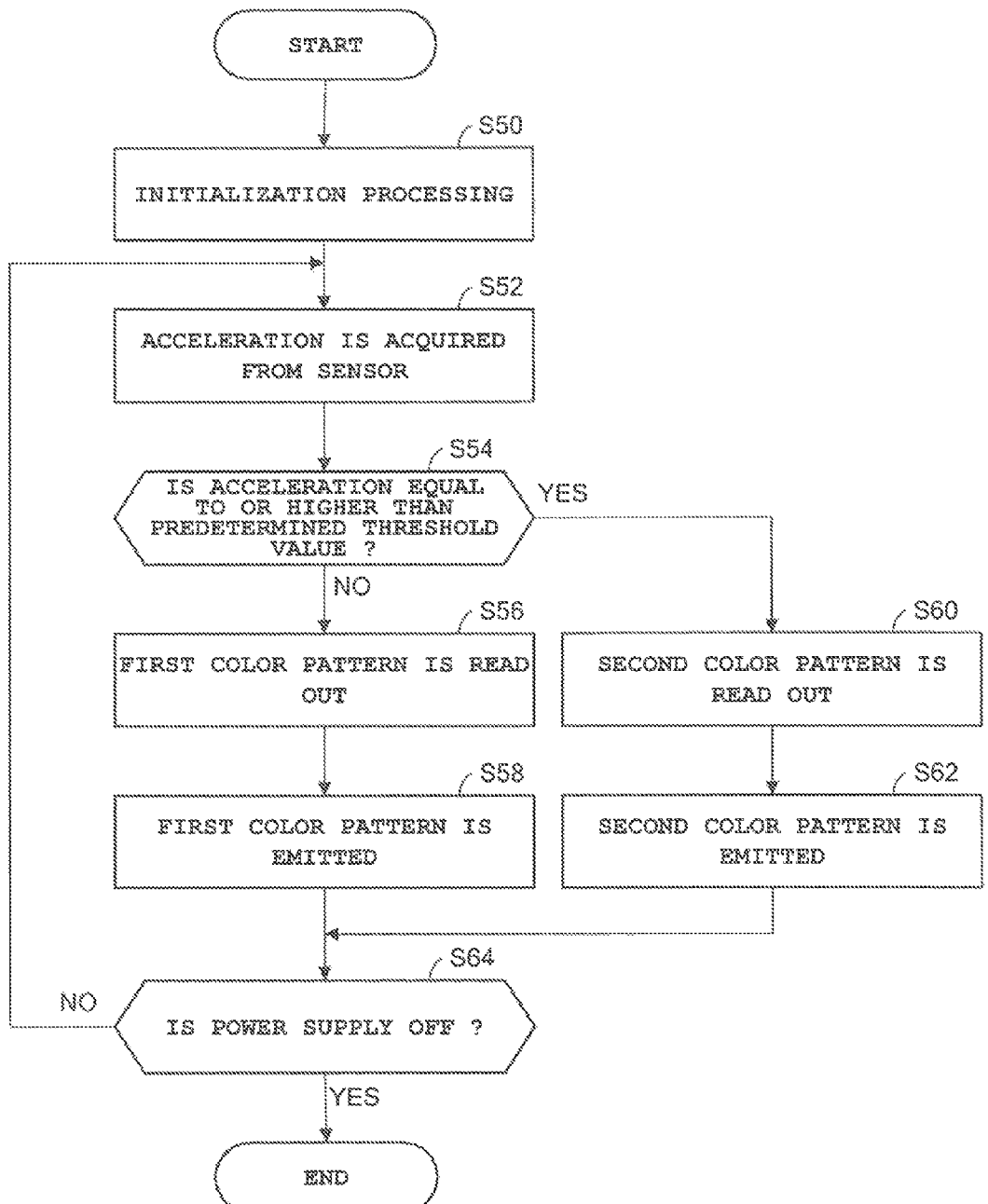
FIG. 10 is a flowchart to describe the operation of the light tag 10 of the second embodiment of the present invention.

Next, the operation of the light tag 10 and the photographing apparatus 20 of the aforementioned second embodiment of the present invention will be described. FIG. 10 is a flowchart to describe the operation of the light tag 10 of the second embodiment. First, the user wears the light tag 10 on his or her wrist and the like, and turns on the power of the light tag 10 before starting to play tennis. Upon the activation of the power supply, the CPU 13 of the light tag 10 performs initialization processing (Step S50). Subsequently, the CPU 13 acquires the acceleration of the light tag 10 (magnitude and velocity of movement) which is detected by the sensor 17, that is, the acceleration of the object (magnitude and velocity of movement) (Step S52), and judges whether or not the acquired acceleration is equal to or higher than a predetermined threshold value (Step S54).

Then, when the acquired acceleration is not equal to or higher than the predetermined threshold value (Step S54, NO), the CPU 13 reads out the first color pattern 11b from the color pattern memory 11 (Step S56) and allows the light emitting section 14 to emit the first color pattern 11b (Step S58). Subsequently, the CPU 13 judges whether or not the operation of turning off the power supply has been performed (Step S64). When the operation of turning off the power supply has not been performed (Step S64, NO), the CPU 13 returns to the Step S52. While the acceleration of the light tag 10 is lower than the predetermined threshold value, the CPU 13 allows the light emitting section 14 to repeatedly emit the first color pattern 11b.

At Step S54, when the acquired acceleration is equal to or higher than the predetermined threshold value (Step S54, YES), the CPU 13 reads out the second color pattern 11c from the color pattern memory 11 (Step S60) and allows the light emitting section 14 to emit the second color pattern 11c (Step S62). Subsequently, the CPU 13 judges whether or not the operation of turning off the power supply has been performed (Step S64). When the operation of turning off the power supply has not been performed (Step S64, NO), the CPU 13 returns to the Step S52. While the acceleration of the light tag 10 is equal to or higher than the predetermined threshold value, the CPU 13 allows the light emitting section 14 to repeatedly emit the second color pattern 11c.

In contrast, when the operation of turning off the power supply has been performed (Step S64, YES), the CPU 13 ends the corresponding processing.

Figure 11:
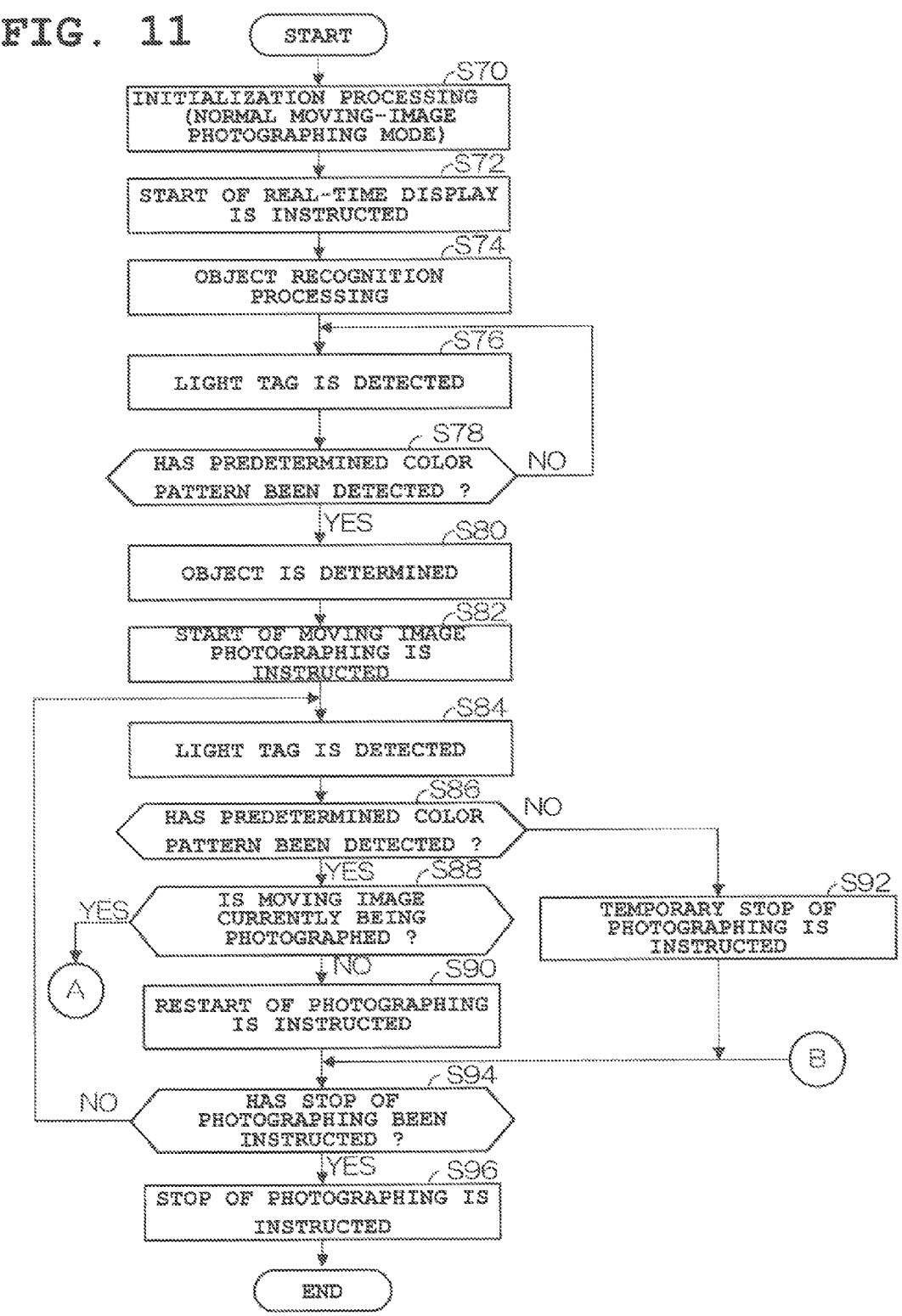
FIG. 11 is a flowchart to describe the operation of the photographing apparatus 20 of the second embodiment of the present invention.
Figure 12:
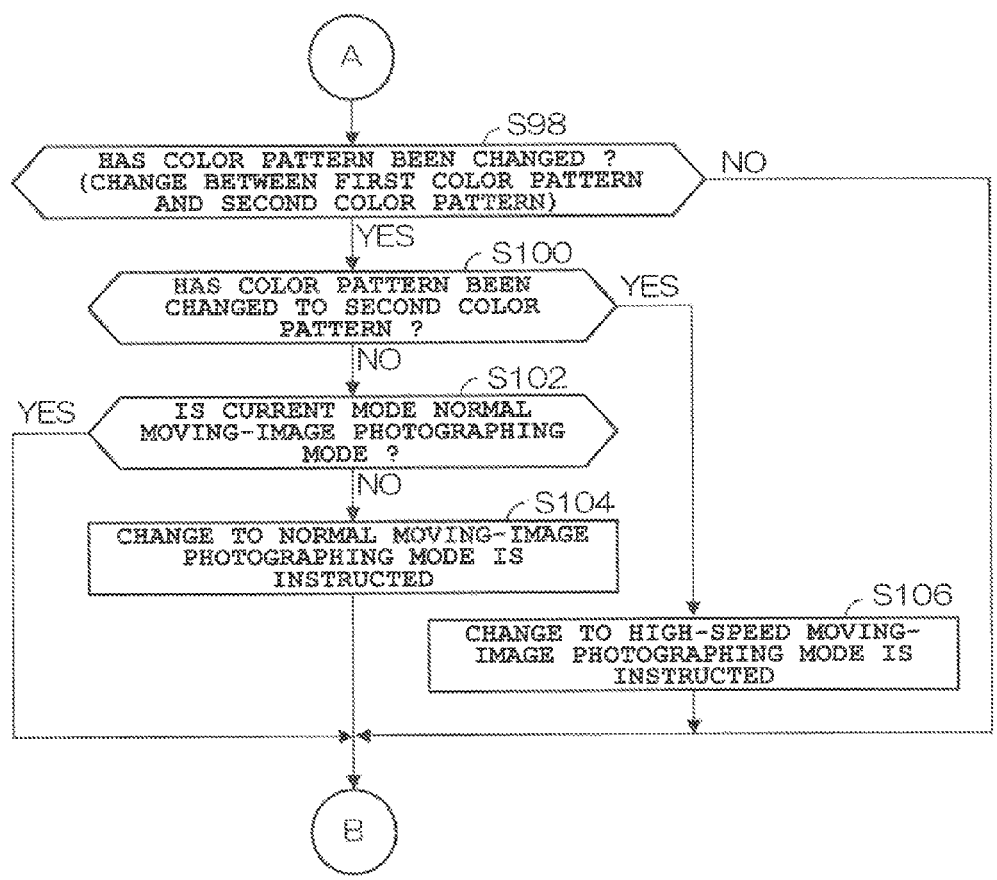
FIG. 12 is a flowchart to describe the operation of the photographing apparatus 20 of the second embodiment of the present invention.

FIG. 11 and FIG. 12 are flowcharts to describe the operation of the photographing apparatus 20 of the second embodiment of the present invention. After the light tag 10 is prepared, the user hooks and fixes the handle section 20c on wire netting and the like, and turns on the power supply of the photographing apparatus 20 by the key input section 26. Upon the activation of the power supply, the CPU 27 of the photographing apparatus 20 performs the initialization processing (setting for the normal moving-image photographing mode) (Step S70) and instructs the photographing section 22 to start real-time display (Step S72). The photographing section 22 receives the instruction and starts the real-time display in which images taken in through the optical lens section 21 are displayed on the display section 25 (the images are not stored).

Next, the CPU 27 performs pattern recognition of a person or the like and executes the object recognition processing by which the object in the images displayed in real time is recognized (Step S74). Subsequently, the CPU 27 detects the light tag 10 in the frame of the recognized object (Step S76) and judges whether or not the first color pattern 24b (11b) has been detected (Step S78). Then, when the first color pattern 24b (11b) has not been detected (Step S78, NO), the CPU 27 returns to the Step S76, and repeats the detection of the light tag 10, that is, the detection of the first color pattern 24b (11b).

In contrast, when the first color pattern 24b (11b) has been detected in the frame of the object in the images displayed in real time (Step S78, YES), the CPU 27 determines the frame of the object, in which the first color pattern 24b (11b) has been detected, as a specific object (Step S80). The specific object is an object to be photographed who is wearing the light tag 10. When the specific object is determined, the CPU 27 instructs the photographing section 22 to start moving image photographing (Step S82). Accordingly, the photographing section 22 starts moving image photographing in the normal moving-image photographing mode. That is, the photographing section 22 electrically converts images taken in through the optical lens section 21 at a predetermined frame rate (for example, 30 fps) into a frame image signal and sequentially stores the moving images in the flash memory 23.

Next, the CPU 27 detects the light tag 10 in the frame of the recognized object during the moving image photographing (Step S84) and judges whether or not a predetermined color pattern has been detected (Step S86). The predetermined color pattern herein may be any one of the first color pattern 24b (11b) or the second color pattern 24c (11c).

Then, when the predetermined color pattern (the first color pattern 24b or the second color pattern 24c) has been detected (Step S86, YES), the CPU 27 judges whether or not the moving image photographing is currently being performed (Step S88). Then, when the moving image photographing is currently being performed (Step S88, YES), the CPU 27 judges whether or not the color pattern has been changed (change between the first color pattern and the second color pattern) (Step S98 in FIG. 12). Then, when the color pattern has not been changed (Step S98, NO), the CPU 27 judges whether or not the stop of the photographing has been instructed via the key input section 26 (Step S94 in FIG. 11). Then, when the stop of the photographing has not been instructed (Step S94, NO), the CPU 27 returns to the Step S84, and repeats the detection of the light tag 10, that is, the detection of the predetermined color pattern (the first color pattern 24b or the second color pattern 24c). That is, while the predetermined color pattern is being detected, the moving image photographing (the normal moving-image photographing mode or the high-speed moving-image photographing mode) is continuously performed.

In contrast, when the predetermined color pattern (the first color pattern 24b or the second color pattern 24c) is no longer detected during the moving image photographing (Step S86, NO), the CPU 27 instructs the photographing section 22 to temporarily stop the moving image photographing (Step S92). Accordingly, the photographing section 22 temporarily stops the moving image photographing. Note that a configuration may be adopted in which the temporary halt of the moving image photographing is not performed immediately after the judgment that the predetermined color pattern (the first color pattern 24b or the second color pattern 24c) is no longer detected, a time lag of a predetermined period of time (for example, approximately 20 seconds or 30 seconds) is provided and, when the predetermined time has elapsed but the predetermined color pattern (the first color pattern 24b or the second color pattern 24c) has not been detected again, the moving image photographing is temporarily stopped.

Subsequently, the CPU 27 judges whether or not the stop of the photographing has been instructed via the key input section 26 (Step S94). When the stop of the photographing has not been instructed (Step S94, NO), the CPU 27 returns to the Step S84, and repeats the detection of the light tag 10, that is, the detection of the predetermined color pattern (the first color pattern 24b or the second color pattern 24c). That is, while the predetermined color pattern (the first color pattern 24b or the second color pattern 24c) is not being detected for some reasons (for example, when the light tag 10 is being covered by an obstacle or the like or when a specific object has moved out of the viewing angle), the moving image photographing is temporarily stopped.

In contrast, when the predetermined color pattern (the first color pattern 24b or the second color pattern 24c) is detected again during the temporary stop of the moving image photographing (Step S86, YES), the CPU 27 judges whether or not the moving image photographing is currently being performed (Step S88). Here, since the moving image photographing is temporarily being stopped (Step S88, NO), the CPU 27 instructs the photographing section 22 to restart the moving image photographing (Step S90). Accordingly, the photographing section 22 restarts the moving image photographing. Subsequently, the CPU 27 judges whether or not the stop of the photographing has been instructed via the key input section 26 (Step S94). When the stop of the photographing has not been instructed (Step S94, NO), the CPU 27 returns to the Step S84, and repeats the detection of the light tag 10, or in other words, the detection of the predetermined color pattern (the first color pattern 24b or the second color pattern 24c). That is, when the predetermined color pattern (the first color pattern 24b or the second color pattern 24c) is detected again, the moving image photographing is restarted.

At Step S86, when the predetermined color pattern (the first color pattern 24b or the second color pattern 24c) has been detected (Step S86, YES), and the moving image photographing is currently being performed (Step S88, YES), and the color pattern is changed (Step S98, YES in FIG. 12), the CPU 27 judges whether or not the color pattern has been changed to the second color pattern 24c (Step S100). When the color pattern has not been changed to the second color pattern 24c, that is, when the change of the color pattern has been made from the second color pattern 24c to the first color pattern 24b (Step S100, NO), the CPU 27 judges whether or not the current mode is the normal moving-image photographing mode (Step S102).

When the current mode is the normal moving-image photographing mode (Step S102, YES), it is not necessary to change the moving-image photographing mode, and therefore the CPU 27 proceeds to the Step S94 in FIG. 11. At Step S94, when the stop of the photographing has not been instructed (Step S94, NO), the CPU 27 returns to the Step S84, and repeats the detection of the light tag 10, that is, the detection of the predetermined color pattern (the first color pattern 24b or the second color pattern 24c).

In contrast, when the color pattern has not been changed to the second color pattern 24c, that is, when the change of the color pattern has been made from the second color pattern 24c to the first color pattern 24b, and the current mode is the high-speed moving-image photographing mode (Step S102, NO), it is necessary to change the moving-image photographing mode. Accordingly, the CPU 27 instructs the photographing section 22 to change the current mode to the normal moving-image photographing mode (Step S104). Then, the CPU 27 proceeds to the Step S94 in FIG. 11. At Step S94, when the stop of the photographing has not been instructed (Step S94, NO), the CPU 27 returns to the Step S84, and repeats the detection of the light tag 10, that is, the detection of the predetermined color pattern (the first color pattern 24b or the second color pattern 24c). That is, when the change of the color pattern has been made from the second color pattern 24c to the first color pattern 24b, the moving-image photographing mode is changed from the high-speed moving-image photographing mode to the normal moving-image photographing mode.

Also, when the color pattern is changed to the second color pattern 24c (Step S100, YES), the CPU 27 instructs the photographing section 22 to change the current mode to the high-speed moving-image photographing mode (Step S106). With regards to the light tag 10, the change to the second color pattern 24c means that the acceleration detected by the sensor 17 becomes equal to or higher than a predetermined threshold value, that is, a specific object (user wearing the light tag 10) substantially moves or rapidly moves. Accordingly, when the color pattern is changed to the second color pattern 24c, the moving-image photographing mode is changed to the high-speed moving-image photographing mode in order to appropriately photograph the movement of the specific object (that is, without becoming blurred) (Step S106). Then, the CPU 27 proceeds to the Step S94 in FIG. 11. At Step S94, when the stop of the photographing has not been instructed (Step S94, NO), the CPU 27 returns to the Step S84, and repeats the detection of the light tag 10, that is, the detection of the predetermined color pattern (the first color pattern 24b or the second color pattern 24c).

Then, when the stop of photographing is instructed via the key input section 26 (Step S94, YES), the CPU 27 instructs the photographing section 22 to stop the moving image photographing (Step S96). Accordingly, the photographing section 22 stops the moving image photographing, and the CPU 27 end the corresponding processing.

FIGS. 13A to 13D are conceptual diagrams to describe the operation of the photographing system 1 of the second embodiment of the present invention. For example, when two players A and B are practicing tennis in a tennis court, one player B out of the two is photographed. As illustrated by first status in FIG. 13A, when the two players A and B are not in the viewing angle of the photographing section 22, the two players A and B are not displayed on the display section 25, and therefore the CPU 27 does not carry out object recognition based on pattern recognition in the viewing angle 250.

Figure 13A:
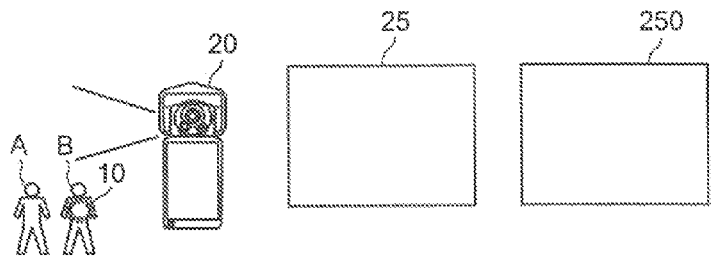
Figure 13B:
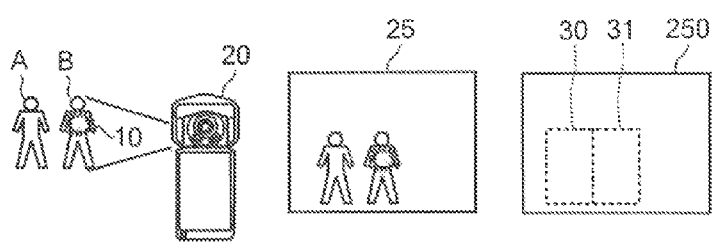

Next, when the two players A and B enters the tennis court, the images of the two players A and B come within the viewing angle of the photographing section 22, and the two players A and B are displayed on the display section 25, as illustrated by second status in FIG. 13B. Subsequently, the CPU 27 carries out object recognition based on pattern recognition in the viewing angle 250 and detects the two players A and B. In the diagram, the recognized objects are illustrated by object frames 30 and 31. Then, the photographing section 22 adjusts the object frames 30 and 31 such that automatic focusing and exposure are appropriately provided.

Figure 13C:
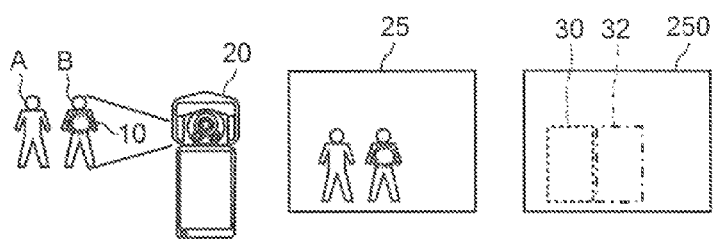

Next, as illustrated by third status in FIG. 13C, when the CPU 27 of the photographing apparatus 20 detects the light tag 10 (first color pattern) worn by the specific player B, the CPU 27 determines the player B in the viewing angle 250 as a specific object (frame 32) and starts moving image photographing in the normal moving-image photographing mode.

Figure 13D:
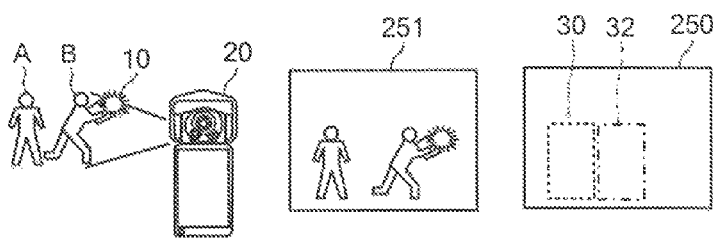

Then, as illustrated by fourth status in FIG. 13D, when the movement of the player B serving as the specific object, that is, acceleration detected by the sensor 17 becomes equal to or higher than a predetermined threshold value, the light tag 10 emits the second color pattern 11c (24c). When it is detected that the emitting pattern of the light tag 10 has been changed to the second color pattern 11c (24c) in the viewing angle 250, the CPU 27 switches the moving-image photographing mode from the normal moving-image photographing mode to the high-speed moving-image photographing mode with regards to the image 251.

Note that, in the normal moving-image photographing mode and the high-speed moving-image photographing mode, the photographing section 22 directly stores images taken in through the optical lens section 21 as a moving image. However, a configuration may be adopted in which images including the object wearing the light tag 10 are cut out (trimming) to be a predetermined size and stored as a moving image, as with the aforementioned first embodiment of the present invention.

According to the aforementioned second embodiment, when the photographing apparatus 20 detects the first color pattern 11b (24b) (first command information) emitted by the light tag 10 which is a transmission apparatus of the visible light communications and worn by an object itself, the photographing apparatus 20 starts moving image photographing. Accordingly, an object wearing the light tag 10 can be brought into focus, and a moving image for which exposure has been appropriately adjusted can be photographed. As a result of this configuration, moving image photographing in accordance with the state of an object (movement in and out of the viewing angle) can be performed.

Also, with regards to the light tag 10, when acceleration detected by the sensor 17 becomes equal to or higher than a predetermined threshold value, the color pattern to be emitted is changed to the second color pattern 11c (24c) (second command information). Accordingly, in the photographing apparatus 20, the moving-image photographing mode is switched to the high-speed moving-image photographing mode which is suitable for photographing the object whose movement is substantially and rapidly changed, so that moving image photographing in accordance with the state of the object (rapid transfer, rapid movement, and the like) can be performed.

In the aforementioned second embodiment, when the stop of photographing is instructed via the key input section 26 and the like, the photographing section 22 stops the moving image photographing. However, the present invention is not limited to thereto, and a configuration may adopted in which an elapsed time from the start of photographing is counted and, when a predetermined period of time has elapsed, the photographing is automatically completed.

Also, in the aforementioned second embodiment, the normal moving-image photographing mode and the high-speed moving-image photographing mode are reciprocally switched in accordance with the switching between the first color pattern 11b and the second color pattern 11c which are emitted by the light tag 10. However, the present invention is not limited to thereto. The normal moving-image photographing mode and consecutive photographing (Still in Movie) during the recording of the moving image may reciprocally be switched. As a result, still images can be photographed in accordance with the state of the object (rapid transfer, rapid movement, and the like). That is, regarding the moving-image photographing mode in which the first color pattern 11b and the second color pattern 11c are used, any combination of the moving-image photographing modes may be applied. As long as the moving-image photographing mode is provided corresponding to the state of the object (movement in and out of the viewing angle, rapid transfer, rapid movement, and the like) based on the second color pattern 11c, any photographing mode may be applied.

C. Third Embodiment

Next, the third embodiment of the present invention will be described. Note that the configurations of the photographing system 1, the light tag 10, and the photographing apparatus 20 of the third embodiment of the present invention are similar to those of the second embodiment of the present invention (FIGS. 8A and 8B), and therefore explanations therefore are omitted. Also, the operation of the light tag 10 is similar to that of the second embodiment (FIG. 10), and therefore explanation therefore is omitted.

In the third embodiment, the CPU 27 of the photographing apparatus 20 receives the light of the aforementioned first color pattern 24b (11b) (first command information) whose color is temporally changed, recognizes the light tag 10, and starts moving image photographing in a normal moving body tracking mode. The normal moving body tracking mode herein is a scheme in which, while pattern recognition of a person is being performed and the change of the object during moving image photographing is being detected and tracked, AF (automatic focusing) and AE (automatic exposure) are performed. Accordingly, in the normal moving body tracking mode, a subject to be tracked is not limited to a specific object wearing the light tag 10, and a person in the viewing angle is also tracked.

Also, the CPU 27 receives the light of the aforementioned second color pattern 24c (11c) (second command information) whose color is temporally changed, switches the current mode to a specific moving body tracking mode which is different from the aforementioned normal moving body tracking mode, and continues the moving image photographing. The specific moving body tracking mode herein is a scheme in which AF (automatic focusing) and AE (automatic exposure) are performed while the change of a specific object wearing the light tag 10 is being detected and tracked. Accordingly, in the specific moving body tracking mode, a specific object wearing the light tag 10 is a subject to be tracked.

As described above, with regards to the acceleration of the light tag 10, when acceleration detected by the sensor 17 becomes equal to or higher than a predetermined threshold value, the color pattern is switched to the second color pattern 24c (11c). That is, when the specific object rapidly moves or transfers, the color pattern is switched to the second color pattern 24c (11c). In cases like this, the specific moving body tracking mode is applied, which makes it possible to track the specific object which is rapidly moving or transferring, with high accuracy.

Figure 14:
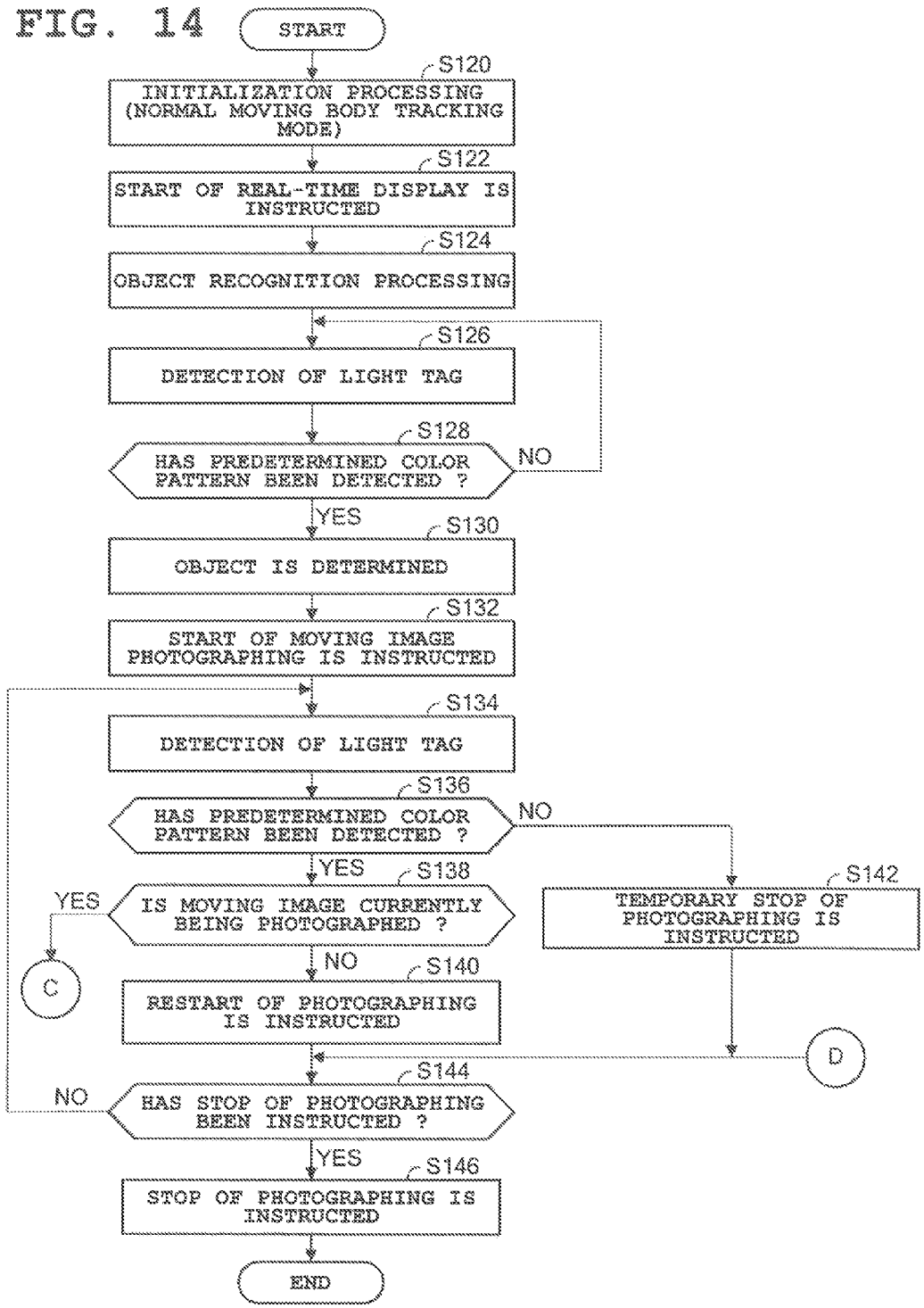
FIG. 14 is a flowchart to describe the operation of the photographing apparatus 20 of a third embodiment of the present invention.
Figure 15:
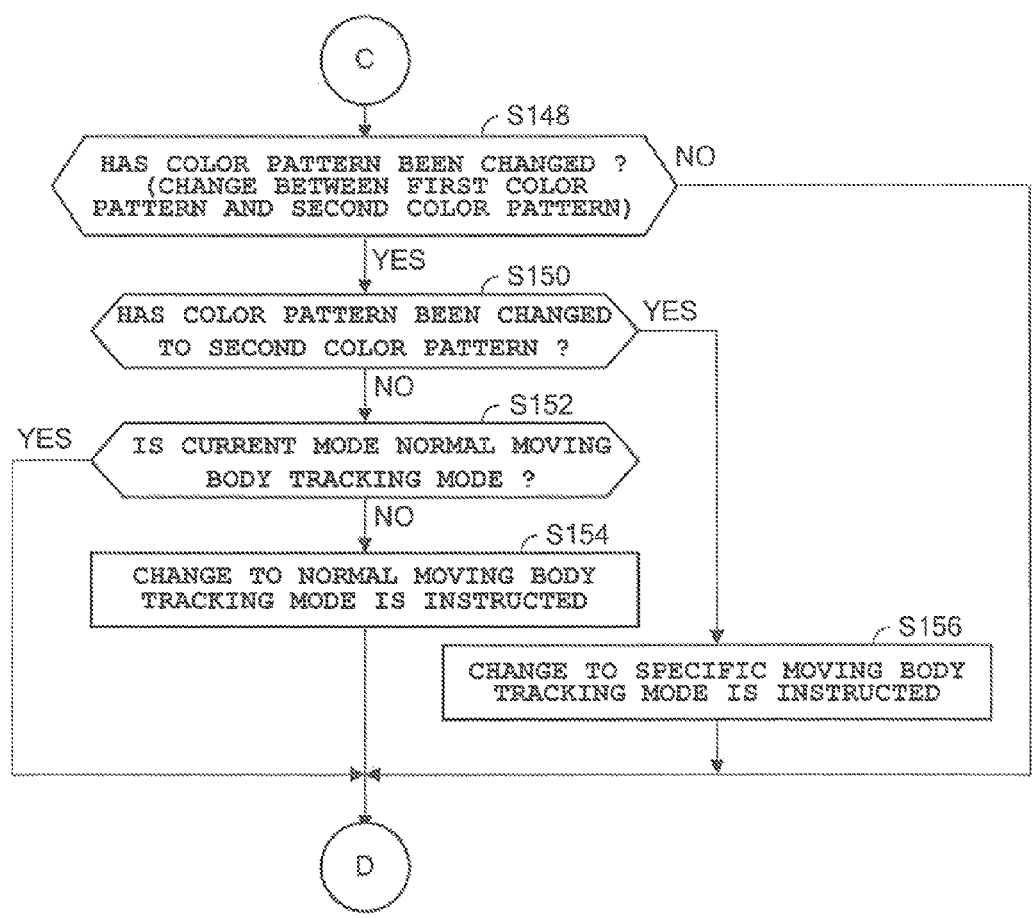
FIG. 15 is a flowchart to describe the operation of the photographing apparatus 20 of the third embodiment of the present invention.

Next, the operation of the photographing apparatus 20 of the aforementioned third embodiment of the present invention will be described. FIGS. 14 and 15 are flowcharts to describe the operation of the photographing apparatus 20 of the aforementioned third embodiment. After the light tag 10 is prepared, the user hooks and fixes the handle section 20c on wire netting and the like, and turns on the power supply of the photographing apparatus 20 by the key input section 26 and the like. Upon the activation of the power supply, the CPU 27 of the photographing apparatus 20 performs initialization processing (settings for the normal moving body tracking mode) (Step S120) and instructs the photographing section 22 to start real-time display (Step S122). The photographing section 22 receives the instruction and starts the real-time display in which images taken in through the optical lens section 21 are displayed on the display section 25 (the image is not stored).

Next, the CPU 27 performs pattern recognition of a person or the like and executes the object recognition processing by which the object in the images displayed in real time are recognized (Step S124). Subsequently, the CPU 27 detects the light tag 10 in the frame of the recognized object (Step S126) and judges whether or not the first color pattern 24b (11b) has been detected (Step S128). Then, when the first color pattern 24b (11b) has not been detected (Step S128, NO), the CPU 27 returns to the Step S126, and repeats the detection of the light tag 10, that is, the detection of the first color pattern 24b (11b).

In contrast, when the first color pattern 24b (11b) in the frame of the object in the images displayed in real time has been detected (Step S128, YES), the CPU 27 determines the frame of the object, in which the first color pattern 24b (11b) has been detected, as a specific object (Step S130). The specific object is an object to be photographed who is wearing the light tag 10. When the specific object is determined, the CPU 27 instructs the photographing section 22 to start moving image photographing (Step S132). Accordingly, the photographing section 22 starts moving image photographing in the normal moving body tracking mode. That is, the photographing section 22 electrically converts images taken in through the optical lens section 21 into a frame image signal and sequentially stores the images in the flash memory 23.

Next, the CPU 27 detects the light tag 10 in the frame of the recognized object during the moving image photographing (Step S134) and judges whether or not a predetermined color pattern has been detected (Step S136). The predetermined color pattern herein may be any one of the first color pattern 24b (11b) or the second color pattern 24c (11c).

When the predetermined color pattern (the first color pattern 24b or the second color pattern 24c) has been detected (Step S136, YES), the CPU 27 judges whether or not the moving image photographing is currently being performed (Step S138). Then, when the moving image photographing is currently being performed (Step S138, YES), the CPU 27 judges whether or not the color pattern has been changed (change between the first color pattern and the second color pattern) (Step S148 in FIG. 15). When the color pattern has not been changed (Step S148, NO), the CPU 27 judges whether or not the stop of the photographing has been instructed via the key input section 26 (Step S144 in FIG. 14). Then, when the stop of the photographing has not been instructed (Step S144, NO), the CPU 27 returns to the Step S134, and repeats the detection of the light tag 10, that is, the detection of the predetermined color pattern (the first color pattern 24b or the second color pattern 24c). That is, while the predetermined color pattern is being detected, the moving image photographing (the normal moving body tracking mode or the specific moving body tracking mode) is continuously performed.

In contrast, when the predetermined color pattern (the first color pattern 24b or the second color pattern 24c) is no longer detected during the moving image photographing (Step S136, NO), the CPU 27 instructs the photographing section 22 to temporarily stop the moving image photographing (Step 142). Accordingly, the photographing section 22 temporarily stops the moving image photographing. Note that a configuration may be adopted in which the temporary halt of the moving image photographing is not performed immediately after the judgment that the predetermined color pattern (the first color pattern 24b or the second color pattern 24c) is no longer detected, a time lag of a predetermined period of time (for example, approximately 20 seconds or 30 seconds) is provided and, when the predetermined time has elapsed but the predetermined color pattern (the first color pattern 24b or the second color pattern 24c) has not been detected again, the moving image photographing is temporarily stopped.

Subsequently, the CPU 27 judges whether or not the stop of the photographing has been instructed via the key input section 26 (Step S144). When the stop of the photographing has not been instructed (Step S144, NO), the CPU 27 returns to the Step S134, and repeats the detection of the light tag 10, that is, the detection of the predetermined color pattern (the first color pattern 24b or the second color pattern 24c). That is, while the predetermined color pattern (the first color pattern 24b or the second color pattern 24c) is not being detected for some reasons (for example, when the light tag 10 is being covered by an obstacle or the like or when a specific object has moved out of the viewing angle), the moving image photographing is temporarily stopped.

In contrast, when the predetermined color pattern (the first color pattern 24b or the second color pattern 24c) is detected again during the temporary stop of the moving image photographing (Step S136, YES), the CPU 27 judges whether or not the moving image photographing is currently being performed (Step S138). Here, since the moving image photographing is temporarily being stopped (Step S138, NO), the CPU 27 instructs the photographing section 22 to restart the moving image photographing (Step S140). Accordingly, the photographing section 22 restarts the moving image photographing.

Subsequently, the CPU 27 judges whether or not the stop of the photographing has been instructed via the key input section 26 (Step S144). When the stop of the photographing has not been instructed (Step S144, NO), the CPU 27 returns to the Step S134, and repeats the detection of the light tag 10, that is, the detection of the predetermined color pattern (the first color pattern 24b or the second color pattern 24c). That is, when the predetermined color pattern (the first color pattern 24b or the second color pattern 24c) is detected again, the moving image photographing is restarted based on the moving body tracking mode at this time point.

At Step S136, when the predetermined color pattern (the first color pattern 24b or the second color pattern 24c) has been detected (Step S136, YES), and the moving image photographing is currently being performed (Step S138, YES), and the color pattern has been changed (Step S148, YES in FIG. 15), the CPU 27 judges whether or not the color pattern has been changed to the second color pattern 24c (Step S150). Then, when the color pattern has not been changed to the second color pattern 24c, that is, when the change of the color pattern has been made from the second color pattern 24c to the first color pattern 24b (Step S150, NO), the CPU 27 judges whether or not the current mode is the normal moving body tracking mode (Step S152).

Then, when the current mode is the normal moving body tracking mode (Step S152, YES), it is not necessary to change the moving body tracking mode, and therefore the CPU 27 proceeds to the Step S144 in FIG. 14. At Step S144, when the stop of the photographing has not been instructed (Step S144, NO), the CPU 27 returns to the Step S134, and repeats the detection of the light tag 10, that is, the detection of the predetermined color pattern (the first color pattern 24b or the second color pattern 240).

In contrast, when the color pattern has not been changed to the second color pattern 24c, that is, when the change of the color pattern has been made from the second color pattern 24c to the first color pattern 24b, and the current mode is the specific moving body tracking mode (Step S152, NO), it is necessary to change the moving body tracking mode, and therefore the CPU 27 instructs the photographing section 22 to change the current mode to the normal moving body tracking mode (Step S154). Then, the CPU 27 proceeds to the Step S144 in FIG. 14. At Step S144, when the stop of the photographing has not been instructed (Step S144, NO), the CPU 27 returns to the Step S134, and repeats the detection of the light tag 10, that is, the detection of the predetermined color pattern (the first color pattern 24b or the second color pattern 24c). That is, when the change of the color pattern is made from the second color pattern 24c to the first color pattern 24b, the moving body tracking mode is changed from the specific moving body tracking mode to the normal moving body tracking mode.

At Step S150, when the color pattern has been changed to the second color pattern 24c (Step S150, YES), the CPU 27 instructs the photographing section 22 to change the current mode to the specific moving body tracking mode (Step S156). With regards to the light tag 10, the change to the second color pattern 24c means that acceleration detected by the sensor 17 becomes equal to or higher than a predetermined threshold value, that is, a specific object (user wearing the light tag 10) substantially moves or rapidly moves.

Accordingly, when the color pattern is changed to the second color pattern 24c, the CPU 27 changes the current mode to the specific moving body tracking mode in order to appropriately track and photograph the movement of the specific object (that is, in order to bring the specific object into focus and appropriately adjust the exposure, without becoming blurred) (Step S156). Then, the CPU 27 proceeds to the Step S144 in FIG. 14. At Step S144, when the stop of the photographing has not been instructed (Step S144, NO), the CPU 27 returns to the Step S134, and repeats the detection of the light tag 10, that is, the detection of the predetermined color pattern (the first color pattern 24b or the second color pattern 24c).

Then, when the stop of the photographing is instructed via the key input section 26 and the like (Step S144, YES), the CPU 27 instructs the photographing section 22 to stop the moving image photographing (Step S146). Accordingly, the photographing section 22 stops the moving image photographing, and the CPU 27 ends the corresponding processing afterwards.

FIGS. 16A to 16D are conceptual diagrams to describe the operation of the photographing system 1 of the third embodiment of the present invention. For example, when two players A and B are practicing tennis in a tennis court, one player B out of the two is photographed. As illustrated by first status in FIG. 16A, when the two players A and B are not in the viewing angle of the photographing section 22, the two players A and B are not displayed on the display section 25, and therefore the CPU 27 does not carry out object recognition based on pattern recognition in the viewing angle 250.

Figure 16A:
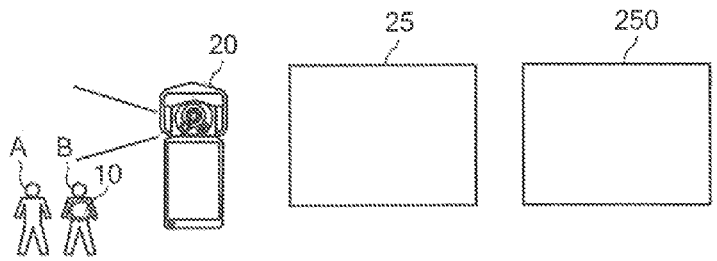
Figure 16B:
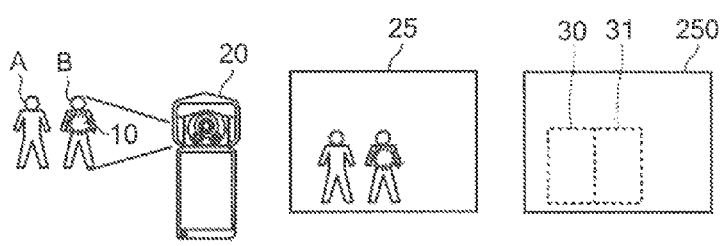

Next, when the two players A and B enters the tennis court, the images of the two players A and B come within the viewing angle of the photographing section 22, and the two players A and B are displayed on the display section 25, as illustrated by second status in FIG. 16B. Subsequently, the CPU 27 carries out object recognition based on pattern recognition in the viewing angle 250 and detects the two players A and B. In the diagram, the recognized objects are illustrated by object frames 30 and 31. Then, the photographing section 22 adjusts the object frames 30 and 31 such that automatic focusing and exposure are appropriately provided.

Figure 16C:
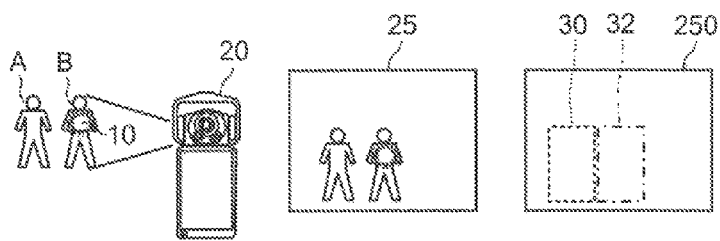

Next, as illustrated by third status in FIG. 16C, when the CPU 27 of the photographing apparatus 20 detects the light tag 10 (first color pattern 24b) worn by the specific player B, the CPU 27 determines the player B as a specific object (frame 32) and starts moving image photographing in the normal moving body tracking mode.

Figure 16D:
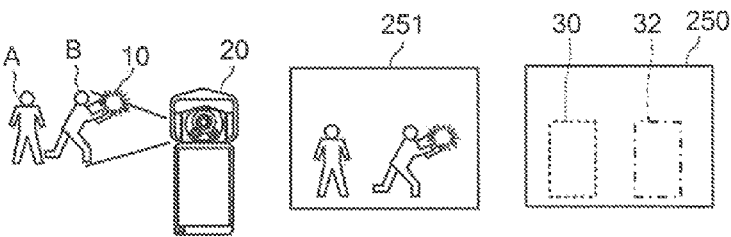

Then, as illustrated by fourth status in FIG. 16D, when the movement of the player B serving as the specific object, that is, acceleration detected by the sensor 17 becomes equal to or higher than a predetermined threshold value, the light tag 10 emits the second color pattern 11c (24c). When it is detected that the emitting pattern of the light tag 10 has been changed to the second color pattern 11c (24c), the CPU 27 switches the moving body tracking mode from the normal moving body tracking mode to the specific moving body tracking mode and continues the moving image photographing with regards to the image 251.

Note that, in the normal moving body tracking mode and the specific moving body tracking mode, the photographing section 22 directly stores images taken in through the optical lens section 21 as a moving image. However, a configuration may be adopted in which images including the object wearing the light tag 10 are cut out (trimming) to be a predetermined size and stored as a moving image, as with the aforementioned second embodiment of the present invention.

According to the aforementioned third embodiment, when the photographing apparatus 20 detects the first color pattern 11b (24b) (first command information) emitted by the light tag 10 which is a transmission apparatus of the visible light communications and worn by an object itself, the photographing apparatus 20 starts moving image photographing in the normal moving body tracking mode. Accordingly, a subject to be tracked can be steadily captured, the object wearing the light tag 10 can be brought into focus, and a moving image for which exposure has been appropriately adjusted can be photographed. As a result of this configuration, moving image photographing in the normal moving body tracking mode in accordance with the state of an object (movement in and out of the viewing angle) can be performed.

Also, according to the aforementioned third embodiment, with regards to the light tag 10, when acceleration detected by the sensor 17 becomes equal to or higher than a predetermined threshold value, the color pattern to be emitted is switched to the second color pattern 11c (24c) (second command information). Then, in the photographing apparatus 20, the current mode is switched to the specific moving body tracking mode which is capable of tracking an object whose movement is substantially and rapidly changed. Therefore, a specific object which rapidly transfers or moves can be tracked with high accuracy and moving image photographing in accordance with the state of the object (rapid transfer, rapid movement, and the like) can be performed.

In the aforementioned third embodiment as well, when the stop of photographing is instructed via the key input section 26 and the like, the photographing is stopped. However, the present invention is not limited to thereto, and a configuration may be adopted in which an elapsed time from the start of photographing is counted and, when a predetermined amount of time elapses, the photographing is automatically completed.

In the aforementioned third embodiment, the change of the color pattern is made from the first color pattern to the second color pattern, whereby the moving-image photographing mode is changed. However, the present invention is not limited to thereto, and a configuration achieved by the second embodiment and the third embodiment being combined may be adopted in which the moving-image photographing mode is changed while the object is being tracked.

D. Fourth Embodiment

Next, the fourth embodiment of the present invention will be described. Note that the configurations of the photographing system 1, the light tag 10, and the photographing apparatus 20 of the fourth embodiment of the present invention are similar to those of the second embodiment of the present invention (FIGS. 8A and 8B), and therefore explanations thereof are omitted.

In the fourth embodiment of the present invention, the key input section 16 of the light tag 10 includes a power source key and a sensitivity changeover switch. The sensitivity changeover switch is designed to switch sensitivity which is used to detect a moment when an impact is applied to an arm of a wearer who is wearing the light tag 10, in plural types of sports such as "tennis", "batter (baseball)", and "volleyball". This sensitivity changeover switch may be provided in a manner to serve also as the power source key.

Also, the sensor 17 of the light tag 10 includes a three-axis acceleration sensor, and thereby detects an impact applied to the light tag 10, that is, the state of the light tag 10. When the degree of shock applied to the light tag 10 detected by the sensor 17 is lower than a predetermined threshold value, the CPU 13 allows the light emitting section 14 to emit the first color pattern 11*b*. In contrast, when the degree of shock is equal to or higher than a predetermined threshold value, the CPU 13 allows the light emitting section 14 to switch the first color pattern 11*b* to the second color pattern 11*c*.

In the fourth embodiment of the present invention, the memory 24 of the photographing apparatus 20 stores the first color pattern 24*b* and the second color pattern 24*c* set in advance, as in the case of the light tag 10. As described in FIG. 9A, the first color pattern 24*b* is represented by the same pattern as that of the first color pattern 11*b* of the light tag 10, that is, by the order of the red (R), the blue (B), the green (G), the red (R), etc. Also, as described in FIG. 9B, the second color pattern 24*c* is represented by the same pattern as that of the second color pattern 11*c* of the light tag 10, that is, by the order of the red (R), the green (G), the red (R), the blue (B), etc.

Figure 17:
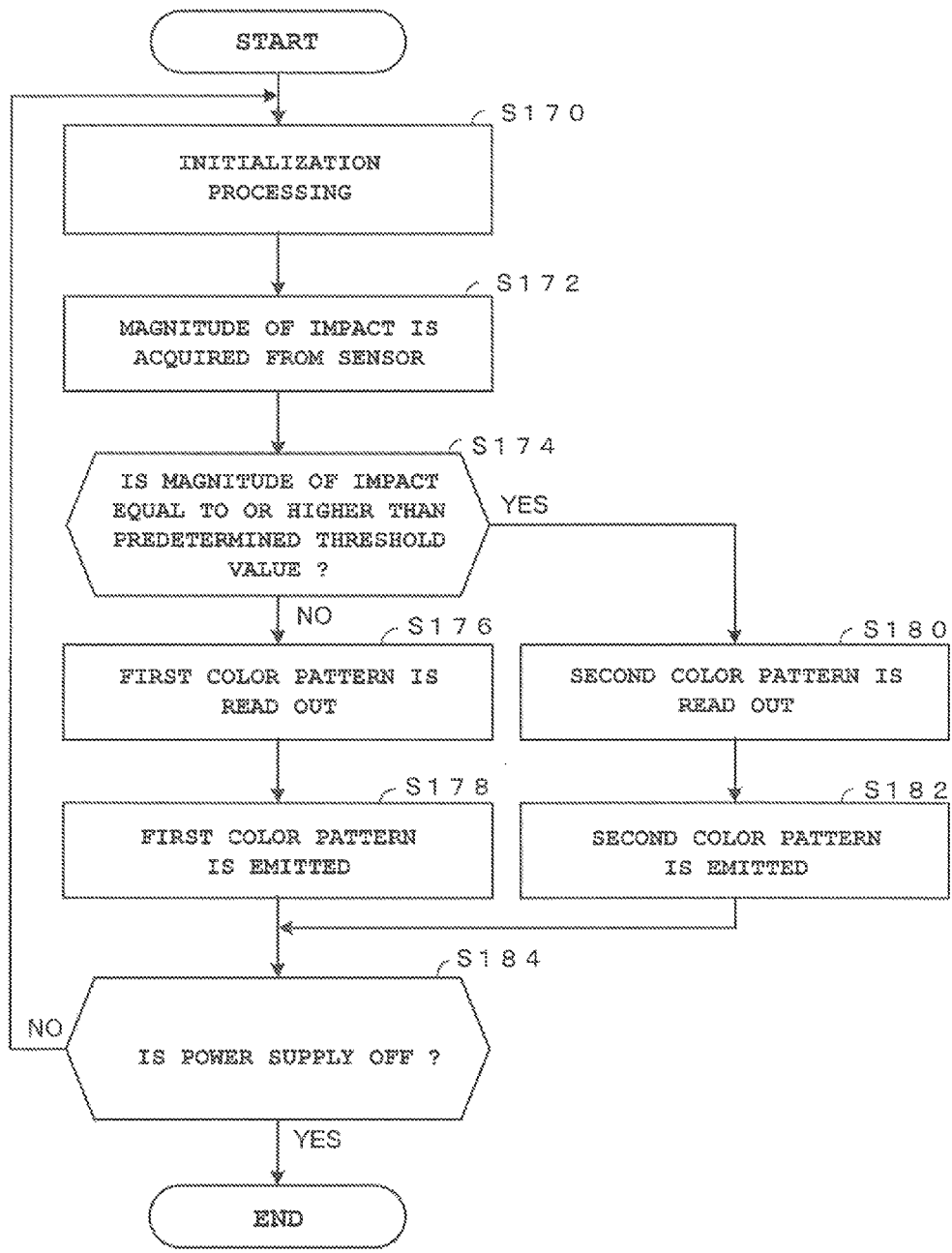
FIG. 17 is a flowchart to describe the operation of the light tag 10 of a fourth embodiment of the present invention.

Next, the operation of the light tag 10 and the photographing apparatus 20 of the aforementioned fourth embodiment of the present invention will be described. FIG. 17 is a flowchart to describe the operation of the light tag 10 worn by a person serving as an object. First, the user wears the light tag 10 on his or her wrist and the like, and turns on the power of the light tag 10 before starting to play tennis. Upon the activation of the power supply, the CPU 13 of the light tag 10 performs initialization processing (Step S170). Subsequently, the CPU 13 acquires each magnitude of acceleration detected by the sensor 17 (for example, three-axis acceleration sensor) at a predetermined cycle, for example, at every one sixtieth (seconds) in the three-axis directions which are intersected with each other. Then, the CPU 13 acquires the magnitude of an impact applied to the light tag 10 based on the acquired information on the three-axis acceleration (Step S172).

Subsequently, the CPU 13 judges whether or not it is the moment of an impact that is received in the selected sport, or in other words, judges whether or not it is the moment of an impact that is received when a ball is hit by a racket in tennis, based on whether or not the degree of the acquired impact is larger than a threshold value corresponding to the switching state of the sensitivity changeover switch of the key input section 16 (Step S174).

When the degree of the acquired impact is not equal to or higher than the predetermined threshold value (Step S174, NO), the CPU 13 sequentially reads out the first color pattern 11*b* from the color pattern memory 11 in synchronization with the clock signal CK from the timing generator 12 (Step S176), and supplies the color pattern (signal), which has been taken out after header information indicating data delivery, to the later-described light emitting section 14.

The light emitting section 14 emits the light P having the first color pattern 11*b* in which color is temporally changed, in synchronization with the clock signal CK from the timing generator 12, through the light emitting window 15 (Step S178). Subsequently, the CPU 13 judges whether or not the operation of turning off the power has been performed (Step S184). When the operation of turning off the power has not been performed (Step S184, NO), the CPU 13 returns to the Step S172 and, as long as the magnitudes of impacts applied to the light tag 10 are lower than a predetermined threshold value, the light emitting section 14 repeatedly emits the first color pattern 11*b*.

Also, when the magnitude of an acquired impact is equal to or higher than the predetermined threshold value (Step S174, YES), the CPU 13 sequentially reads out the second color pattern 11 from the color pattern memory 11 in synchronization with the clock signal CK from the timing generator 12 (Step S180), and the light emitting section 14 emits the light P having the second color pattern 11*c* in which color is temporally changed, in synchronization with the clock signal CK from the timing generator 12, via the light emitting window 15 (Step S182). Subsequently, the CPU 13 judges whether or not the operation of turning off the power has been performed (Step S184). When the operation of turning off the power has not been performed (Step S184, NO), the CPU 13 returns to the Step S172.

In contrast, when the operation of turning off the power has been performed (Step S184, YES), the CPU 13 ends the corresponding processing.

FIG. 19 is a diagram illustrating temporally sequential images of a scene where a person wearing the light tag 10 is playing tennis. In the diagram, images (005) to (019) illustrate states where the light emitting section 14 of the light tag 10 is emitting the first color pattern 11*b*, in which the moment of an impact is not shown.

In contrast, images (020) to (021) in FIG. 19 illustrate states where the light emitting section 14 of the light tag 10 is emitting the second color pattern 11*c*, in which the moment of an impact is shown.

Next, the details of processing on the side of the photographing apparatus 20 which photographs the aforementioned scene will be described referring to FIG. 18.

Figure 18:
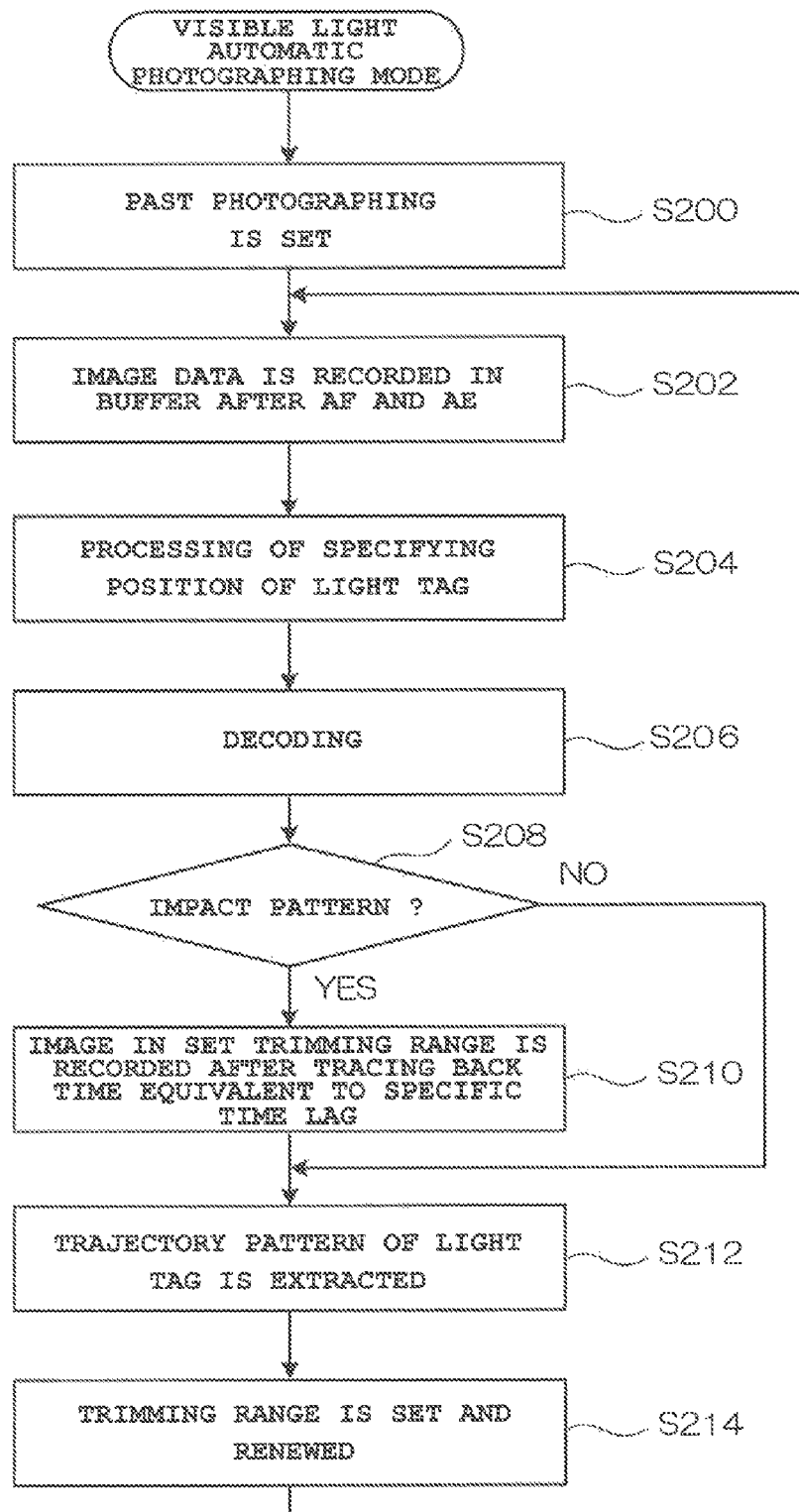
FIG. 18 is a flowchart to describe the operation of the photographing apparatus 20 of the fourth embodiment of the present invention.

FIG. 18 is a flowchart to describe an operation in the photographing mode of the photographing apparatus 20 which is referred to as "visible light automatic photographing mode".

At the beginning of the operation, the CPU 27 sets a past photographing mode in which a preceding constant capacity, which is, for example, the number of photographed images (the number of frames) equivalent to two seconds of photographing time, is continuously held in the memory 24 (Step S200). Then, the CPU 27 executes AF (Automatic Focusing) processing and AE (Automatic Exposure) processing, appropriately sets a focusing distance, an aperture value, and a shutter speed with respect to the object, photographs an image of the object, and holds the acquired image data in the memory 24 (Step S202).

Subsequently, the CPU 27 specifies the position of the light emitting section 14 of the light tag 10 in the image data inputted from the memory 24 (Step S204), and demodulates the code of command information superposed from a blinking pattern at a specific position (Step S206).

The CPU 27 judges whether or not the contents of the demodulated code of command information is the second color pattern 24*c* set as an impact pattern (Step S208).

When the CPU 27 judges that the demodulated code of command information does not correspond to the code of command information set as the impact pattern (the second color pattern 24*c*) (Step S208, NO), the CPU 27 extracts a trajectory pattern of the coordinates of the light tag 10 that is moving in the image and images for a predetermined period of time which is being held in the memory 24 (Step S212).

In the extraction of the trajectory pattern, the trajectory pattern is extracted in a manner that the images including the images held in the memory 24 are accumulated, for example, approximately in every ten cycles to fifteen cycles. A higher degree of weighting is added in proportion to the range of pattern newly extracted in terms of time, whereby change in relative positional relation between the object and the photographing apparatus 20, which is involved with a lapse of time in photographing, is taken into consideration.

Then, after setting and renewing the later-described trimming range that is used after image photographing, based on the latest extracted trajectory pattern (Step S214), the CPU 27 returns to the aforementioned Step S202.

Thus, in the course of repeatedly executing the processing at Step S202 to S208, S212, and S214, the trajectory pattern of the coordinates of the light tag 10 which transfers in the image is extracted at all times, and a higher degree of weighting is added to a newer trajectory pattern in terms of time, and the renewal of the range of trimming is set based on the trajectory pattern.

However, at Step S208, when the CPU 27 judges that the contents of the demodulated code of the command information is the second color pattern 24c set as the impact pattern (Step S208, YES), the CPU 27 selects an image held at a time point traced back the time equivalent to a specific time lag set in advance, from among a series of image data held in the memory 24. For example, the CPU 27 selects an image held "0.1 seconds" ago, executes cut-out processing for the selected image data based on the trimming range at that point, applies predetermined data compression to the image data acquired through the processing, integrates the image data into data file, and allows the flash memory 23 to store the data file (Step S210).

Finally, the CPU 27 judges that the automatic photographing according to a series of visible light communications is completed, and returns to Step S202 to prepare for the next image photographing.

FIG. 20 is a diagram exemplifying the range of the trimming that is executed herein by the CPU 27 with respect to the image held in the memory 24. A reference number A1 in the diagram illustrates the whole range of the image data held in the memory 24, that is, the range of the image formed on the photographing section 22 through the optical lens section 21 at this point.

The trajectory TR of the light tag 10 which is constituted by the light emitting section 14 of the light tag 10 depicts a pattern illustrated by an arrow in the diagram. As illustrated in the diagram, a trimming range A2 is acquired based on the aspect ratio of the set image size at this point such that the lateral length of the trimming range is equal to or longer than twice the left-and-right width W of the trajectory TR and the longitudinal length of the trimming range is equal to or longer than three times the up-and-down width H of the trajectory TR, and then reflected on the image to be stored.

Note that the setting environment of the lateral and longitudinal lengths of the trimming range A2 with respect to the trajectory TR of the aforementioned light tag 10 is not indiscriminately determined but arbitrarily changed and set by a menu mode set in advance by the user of the photographing apparatus 20.

As described above in detail, in the aforementioned fourth embodiment, an instantaneous image which the photographer desires can steadily be photographed irrespective of the proficiency of the photographer, without wastefully consuming the medium resources.

Also, in the aforementioned fourth embodiment, the trimming range of an image to be stored is automatically set based on the range of the trajectory which the light tag 10 can take in the photographed image, so that image composition which the photographer deems correct can automatically be acquired without imposing the burden on the photographer.

Moreover, in the aforementioned fourth embodiment, the key input section 16 of the light tag 10 includes the sensitivity changeover switch, and the sensitivity changeover switch is designed to switch sensitivity which is used to detect a moment when an impact is applied to an arm of a person wearing the light tag 10, in plural types of sports such as "tennis", "batter (baseball)", and "volleyball". As a result of this structure, one light tag can be used for plural types of sports so as to assist image photographing.

Also, in place of the light tag 10, the light emitting apparatus may be applied to tools used for other sports, such as a golf ball used in golf (a moment of an impact can be detected) or a helmet used in a motocross motorcycle race (state of gravity at a peak position can be detected when a motorcycle jumps in the air).

In the aforementioned first to fourth embodiments, the color pattern in which different colors are provided in time series is emitted. However, the present invention is not limited thereto. A plurality of light signals may be generated by changing the levels of brightness of light having a single color or changing the periods of time during which the light is emitted, or the cycles of lighting.

Also, in the aforementioned first to fourth embodiments, the present invention is applied to the visible light communications system constituted by the light tag 10 which is the light emitting apparatus for photographing sports activities, and the photographing apparatus 20 which is the light receiving apparatus for photographing sports activities. However, the present invention is not limited thereto. For example, in place of the photographing apparatus 20, the present embodiments may be applied to portable phone terminals having a camera function, smart phones, tablet personal computers, and the like.

In a scheme in which a photographing apparatus is externally controlled with the use of the conventional technologies regarding the wireless systems such as Bluetooth (registered trade mark) and infra-red rays, it is necessary to newly provide hardware for receiving wireless signals used in Bluetooth (registered trademark) or receiving infra-red rays. However, in the external control scheme of a photographing apparatus in which the visible light communications according to the present invention are used, visible light in which information has been superposed is recognized by the image sensor elements which the image sensor originally includes, and externally controlled. Accordingly, the present invention has an advantageous effect in that external control can be performed without adding any hardware to the image sensor.

Also, the wireless systems in the conventional technologies, such as Bluetooth (registered trade mark) and infra-red rays, are short-range communications in which a communication range is generally, approximately 10 meters at its maximum. However, in the visible light communications of the present invention, when visible light in which information has been superposed is recognized, communications are possible even by one pixel in the image sensor elements included in the image sensor. Accordingly, the present invention has an advantageous effect in that external control can be performed from hundreds of meters or more away.

While the present invention has been described with reference to the preferred embodiments, it is intended that the invention be not limited by any of the details of the description therein but includes all the embodiments which fall within the scope of the appended claims.

What is claimed is:

1. A photographing system comprising:
a light emitting apparatus which emits visible light including arbitrary information; and
a photographing apparatus which has a plurality of photographing functions,
wherein the light emitting apparatus comprises:
a light emitting section which emits visible light including command information respectively corresponding to the plurality of photographing functions of the photographing apparatus, and
wherein the photographing apparatus comprises:
a photographing section;

a visible light information acquisition section which receives the visible light emitted by the light emitting section by the photographing section, and acquires the command information included in the visible light;

a photographing instruction section which instructs to perform at least one of the plurality of photographing functions based on the command information acquired by the visible light information acquisition section;

a range extraction section which extracts a range in which the visible light including the command information moves within images photographed by the photographing section; and a record control section which performs trimming on a selected image based on the range extracted by the range extraction section, and records the trimmed image.

2. The photographing system according to claim 1, wherein the light emitting section emits a color pattern in which RGB color components are provided in a predetermined order, as the command information.

3. The photographing system according to claim 1, wherein the light emitting apparatus further comprises:
a sensor which detects a state of the light emitting apparatus;
a judgment section which judges whether a value detected by the sensor is equal to or higher than a threshold value set in advance; and
a light emitting control section which controls the light emitting section to emit the visible light including the command information in accordance with a result of judgment by the judgment section.

4. The photographing system according to claim 3, wherein the sensor detects acceleration of the light emitting apparatus, and
wherein the judgment section judges whether the acceleration detected by the sensor is equal to or higher than a threshold value set in advance.

5. The photographing system according to claim 3, wherein the sensor detects an impact received by the light emitting apparatus, and
wherein the judgment section judges whether a magnitude of the impact detected by the sensor is equal to or higher than a threshold value set in advance.

6. The photographing system according to claim 3, wherein the light emitting apparatus further comprises:
a threshold value change section which variably sets the threshold value which serves as a judgment criterion for the judgment section.

7. The photographing system according to claim 1, wherein the photographing apparatus further comprises:
a holding section which holds a predetermined number of images photographed by the photographing section while renewing the images, and
wherein the record control section selects and records an image held at a timing set in advance, from among the images held by the holding section.

8. The photographing system according to claim 7, wherein the holding section holds a predetermined number of still images photographed by the photographing section while renewing the still images, and
wherein the record control section selects and records a still image held at the timing set in advance, from among the still images held by the holding section.

9. The photographing system according to claim 7, wherein the photographing instruction section instructs the photographing section to perform moving image photographing, when the command information acquired by the visible light information acquisition section is first command information.

10. The photographing system according to claim 9, wherein the holding section holds a moving image photographed for a predetermined period of time by the photographing section while renewing the moving image, and
wherein the record control section, when the command information acquired by the visible light information acquisition section is the first command information, records the moving image held by the holding section from a time point traced back a predetermined period of time from when the first command information is received.

11. A photographing system comprising:
a light emitting apparatus which emits visible light including arbitrary information; and
a photographing apparatus which has a plurality of photographing functions,
wherein the light emitting apparatus comprises:
a light emitting section which emits visible light including command information respectively corresponding to the plurality of photographing functions of the photographing apparatus;
a sensor which detects acceleration of the light emitting apparatus;
a judgment section which judges whether the acceleration detected by the sensor is equal to or higher than a threshold value set in advance; and
a light emitting control section which controls the light emitting section to emit the visible light including the command information in accordance with a result of judgment by the judgment section,
wherein the photographing apparatus comprises:
a photographing section;
a visible light information acquisition section which receives the visible light emitted by the light emitting section by the photographing section, and acquires the command information included in the visible light;
a photographing instruction section which instructs to perform at least one of the plurality of photographing functions based on the command information acquired by the visible light information acquisition section;
a holding section which holds a moving image photographed for a predetermined period of time by the photographing section while renewing the moving image; and
a record control section which records the moving image held by the holding section at a timing set in advance,
wherein the light emitting control section in the light emitting apparatus emits visible light including first command information when a magnitude of the acceleration judged by the judgment section is lower than a predetermined threshold value, and emits visible light including second command information when the magnitude of the acceleration judged by the judgment section is equal to or higher than the predetermined threshold value,
wherein the photographing section in the photographing apparatus performs moving image photographing at a first frame rate or a second frame rate that is larger than the first frame rate, and
wherein the photographing instruction section instructs the photographing section to perform moving image photographing at the first frame rate, when the command information acquired by the visible light information acquisition section is the first command information, and instructs the photographing section to perform moving image photographing at the second frame rate, when the command information acquired by the visible light information acquisition section is the second command information.

12. The photographing system according to claim 11, wherein the photographing instruction section instructs the photographing section to perform moving image photographing at the first frame rate, when the command information acquired by the visible light information acquisition section is the first command information, and instructs the photographing section to perform consecutive photographing during moving image photographing, when the command information acquired by the visible light information acquisition section is the second command information.

13. The photographing system according to claim 11, wherein the photographing section in the photographing apparatus performs moving image photographing by one of a first moving body tracking scheme by which an object recognized by pattern recognition is tracked and a second moving body tracking scheme by which an object mounted with the light emitting apparatus is tracked, and
wherein the photographing instruction section instructs the photographing section to perform moving image photographing by the first moving body tracking scheme, when the command information acquired by the visible light information acquisition section is the first command information, and instructs the photographing section to perform moving image photographing by the second moving body tracking scheme, when the command information acquired by the visible light information acquisition section is the second command information.

14. The photographing system according to claim 11, wherein the light emitting apparatus further comprises:
a sensor which detects an impact received by the light emitting apparatus;
wherein the judgment section judges whether a magnitude of the impact detected by the sensor is equal to or higher than a threshold value set in advance,
wherein the holding section of the photographing apparatus holds a predetermined number of still images photographed by the photographing section while renewing the still images,
wherein the record control section selects and records a still image held by the holding section at a timing set in advance, from among the still images held by the holding section,
wherein the light emitting control section in the light emitting apparatus emits visible light including first command information, when the magnitude of the impact judged by the judgment section is lower than a predetermined threshold value, and emits visible light including second command information, when the magnitude of the impact judged by the judgment section is equal to or higher than the predetermined threshold value, and
wherein the photographing instruction section in the photographing apparatus instructs the holding section to hold the predetermined number of still images photographed by the photographing section while renewing the still images, when the command information acquired by the visible light information acquisition section is the first command information, and instructs the record control section to select and record the still image held at the timing set in advance, from among the still images held by the holding section, when the command information acquired by the visible light information acquisition section is the second command information.

15. A photographing method using a light emitting apparatus which emits visible light including arbitrary information and a photographing apparatus which includes a photographing section and has a plurality of photographing functions, comprising:
operating the light emitting apparatus to emit visible light including command information respectively corresponding to the plurality of photographing functions of the photographing apparatus;
operating the photographing apparatus to receive the emitted visible light, and acquire the command information included in the visible light;
instructing the photographing apparatus to perform at least one of the plurality of photographing functions based on the acquired command information;
extracting a range in which the visible light including the command information moves within images photographed by the photographing section; and
performing trimming on a selected image based on the extracted range, and recording the trimmed image.

16. A photographing apparatus having a plurality of photographing functions, comprising:
a photographing section;
a visible light information acquisition section which receives visible light including command information by the photographing section, and acquires the command information included in the visible light;
a photographing instruction section which instructs to perform at least one of the plurality of photographing functions based on the command information acquired by the visible light information acquisition section;
a range extraction section which extracts a range in which the visible light including the command information moves within images photographed by the photographing section; and
a record control section which performs trimming on a selected image based on the range extracted by the range extraction section, and records the trimmed image.

17. A non-transitory computer-readable storage medium having stored thereon a program that is executable by a computer in a photographing apparatus including a photographing section and having a plurality of photographing functions, the program being executable by the computer to perform functions comprising:
a visible light information acquisition processing for receiving visible light including command information by the photographing section, and acquiring the command information included in the visible light;
a photographing instruction processing for instructing to perform at least one of the plurality of photographing functions based on the command information acquired in the visible light information acquisition processing;
a range extraction processing for extracting a range in which the visible light including the command information moves within images photographed by the photographing section; and
a record control processing for performing trimming on a selected image based on the range extracted in the range extraction processing, and records the trimmed image.

* * * * *